(12) United States Patent
Ishikake et al.

(10) Patent No.: US 9,090,105 B2
(45) Date of Patent: Jul. 28, 2015

(54) IMAGE RECORDING SYSTEM, IMAGE REWRITING SYSTEM, AND IMAGE RECORDING METHOD

(71) Applicants: Satoru Ishikake, Kanagawa (JP); Kazutaka Yamamoto, Kanagawa (JP)

(72) Inventors: Satoru Ishikake, Kanagawa (JP); Kazutaka Yamamoto, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/088,987

(22) Filed: Nov. 25, 2013

(65) Prior Publication Data
US 2014/0152756 A1    Jun. 5, 2014

(30) Foreign Application Priority Data

Nov. 30, 2012 (JP) .................................. 2012-263048
Oct. 17, 2013 (JP) .................................. 2013-215911

(51) Int. Cl.
*B41J 2/435* (2006.01)
*B41J 11/00* (2006.01)
*G06K 1/12* (2006.01)

(52) U.S. Cl.
CPC *B41J 11/007* (2013.01); *G06K 1/12* (2013.01)

(58) Field of Classification Search
CPC ................................. B41J 11/007; B41J 13/08
USPC .................................. 347/224, 225, 262, 264
See application file for complete search history.

(56) References Cited

U.S. PATENT DOCUMENTS

| 7,439,993 | B2 | 10/2008 | Ishimi et al. |
| 8,101,334 | B2 | 1/2012 | Ishimi et al. |
| 8,164,610 | B2 * | 4/2012 | Nakata et al. .................. 347/224 |
| 2006/0094599 | A1 * | 5/2006 | Kuboyama et al. ........... 503/201 |
| 2008/0153698 | A1 | 6/2008 | Kawahara et al. |
| 2008/0192618 | A1 | 8/2008 | Nakata et al. |
| 2009/0075816 | A1 | 3/2009 | Kawahara et al. |

FOREIGN PATENT DOCUMENTS

| JP | 2001-113758 | 4/2001 |
| JP | 2007-076122 | 3/2007 |
| JP | 2007-282074 | 10/2007 |
| JP | 2008-134801 | 6/2008 |
| JP | 2008-194905 | 8/2008 |

* cited by examiner

*Primary Examiner* — Hai C Pham
(74) *Attorney, Agent, or Firm* — Cooper & Dunham LLP

(57) ABSTRACT

Provided is an image recording system for recording an image on a recording medium attached to a conveyed article, including: a conveyor device conveying the conveyed article in a predetermined conveying direction; and a recording device provided on at least one side of the conveyor device in a direction perpendicular to the conveying direction and capable of contactlessly recording the image on the recording medium being located at a position facing itself. The image includes a scan image to be read by a reading device. The conveyor device decelerates the conveyed article by observing a position at which the recording medium will face the recording device as a target stop position. The recording device records the scan image on the recording medium after the conveyed article reaches the target stop position and while the amplitude of vibration of the conveyed article is equal to or smaller than a reference value.

15 Claims, 25 Drawing Sheets

I: comprehensive grade C, readable by barcode reader
II: comprehensive grade D, readable by barcode reader
III: comprehensive grade F, unreadable by barcode reader I: comprehensive grade C, readable by barcode reader
II: comprehensive grade D, readable by barcode reader
III: comprehensive grade F, unreadable by barcode reader I: comprehensive grade C, readable by two-dimensional code reader
II: comprehensive grade D, readable by two-dimensional code reader
III: comprehensive grade F, unreadable by two-dimensional code reader

IMAGE RECORDING SYSTEM, IMAGE REWRITING SYSTEM, AND IMAGE RECORDING METHOD

BACKGROUND OF THE INVENTION

1. Field of the Invention

The present invention relates to an image recording system, an image rewriting system, and an image recording method, and particularly to an image recording system configured to record an image on a recording medium attached to an article being conveyed, an image rewriting system including the image recording system, and an image recording method for recording the image.

2. Description of the Related Art

Conventionally, a technique is known which decelerates a conveyed article, which is being conveyed with a recording medium attached thereon, so that the article may be stopped at a target stop position, which is a predetermined position on the conveying path, and records an image including a scan image (e.g., a barcode) on the recording medium when the conveyed article arrives at the target stop position (e.g., see Japanese Patent Application Laid-Open (JP-A) No. 2008-194905).

However, with the technique disclosed in JP-A No. 2008-194905, the quality of a scan image to be recorded on the recording medium might be poorer than a level readable by a reading device.

SUMMARY OF THE INVENTION

The present invention is an image recording system for recording an image on a recording medium attached to a conveyed article, including: a conveyor device configured to convey the conveyed article in a predetermined conveying direction: and a recording device provided on at least one side of the conveyor device in a direction perpendicular to the conveying direction and capable of contactlessly recording the image on the recording medium being located at a position facing the recording device. The image includes a scan image to be read by a reading device. The conveyor device decelerates the conveyed article by observing a position at which the recording medium will face the recording device as a target stop position. The recording device records the scan image on the recording medium after the conveyed article reaches the target stop position and while the amplitude of vibration of the conveyed article is equal to or smaller than a reference value.

According to the present invention, the quality of a scan image to be recorded on a recording medium can match or excel the level readable by a recording medium.

Figure 1:
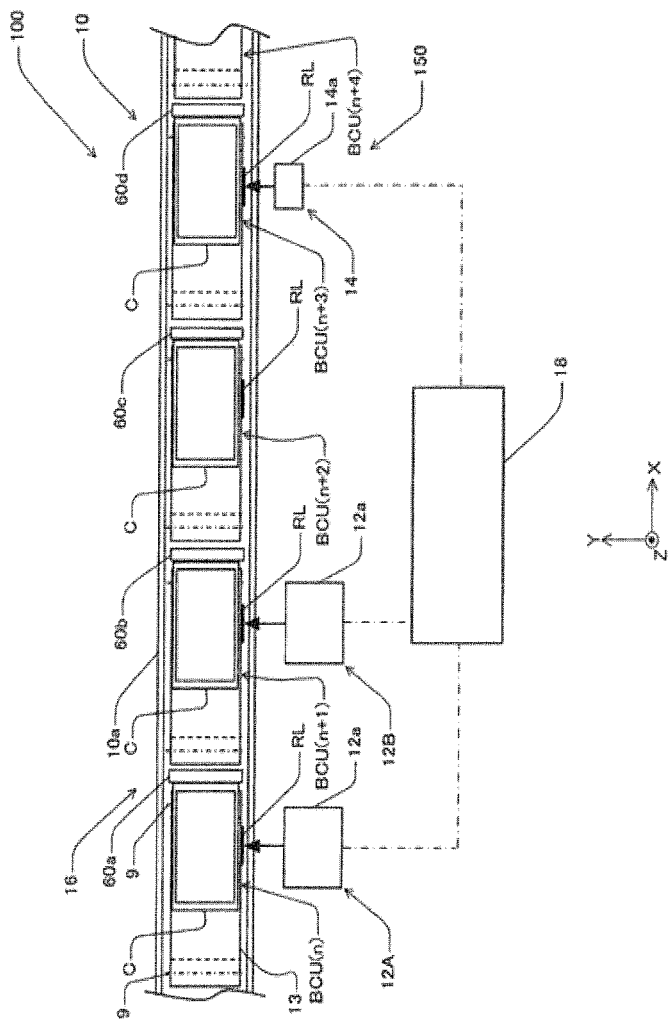
FIG. 1 is a diagram showing a schematic configuration of an image rewriting system according to an embodiment of the present invention.

DETAILED DESCRIPTION OF THE INVENTION (Image Recording Method)

An image recording method of the present invention includes at least an image recording step, and further includes other steps according to necessity.

<Image Recording Step>

The image recording step is a step of recording an image by heating a medium. For example, there are a method of recording an image by heating the medium with a thermal head, and a method of recording an image by heating the medium by irradiating it with laser light of which irradiation energy is adjusted based on the distance to the medium. Laser image recording is preferable, because it can record an image contactlessly and therefore can realize preferable image recording even when the medium has an inclination or a curve.

<Image Erasing Step>

When image recording is applied on a thermally reversible recording medium, there may be an image erasing step of erasing the image recorded on the thermally reversible recording medium by heating the thermally reversible recording medium on which the image is formed.

Examples of the method for heating the thermally reversible recording medium include conventionally known heating methods (contactless heating methods such as laser light irradiation, hot air, hot water, and an infrared heater, and contact heating methods such as a thermal head, a hot stamp, a heat block, and a heat roller). In consideration of a material flow line, the method of heating a thermosensitive recording medium such as a thermally reversible recording medium by irradiating it with laser light is particularly preferable because this method can erase an image contactlessly.

As a laser source, any of a YAG laser, a fiber laser, and a semiconductor laser is preferable.

<Reading Device>

A reading device used in the present invention is not particularly limited and can be appropriately selected according to the purpose, as long as it has a function of irradiating the image recorded on the recording medium with light, and based on whether the light reflected is strong or weak, electrically reading the image information. Examples thereof include a barcode reader, a two-dimensional code reader, and an OCR reader. A barcode reader, a two-dimensional code reader, and an OCR reader are devices configured to read a barcode symbol, a two-dimensional code symbol, and OCR characters, respectively, and each include a scanner configured to convert optical information to electric information, and a decoder configured to convert electric information to character codes.

A barcode symbol is an image carrier that represents information with an arrangement of elongate rectangular bars and spaces and that can be read with a machine by being scanned in a direction perpendicular to the bars and spaces. A two-dimensional symbol is an image carrier that can be read with a machine by being scanned in both of the directions parallel with and perpendicular to itself. Examples of barcode symbols include JAN, Code39, and ITF. Examples of two-dimensional symbols include QR code, DataMatrix, and PDF417.

Examples of barcode readers and two-dimensional code readers include CCD type barcode readers and CCD type two-dimensional code readers that are configured to read an image by irradiating the image with a LED and receiving diffusely reflected light with a CCD image sensor. They are preferable in that they are small and inexpensive. Examples further include laser type barcode readers and laser type two-dimensional code readers that are configured to read an image by scanning the image with laser light and receiving diffusely reflected light with a light receiving element. They are preferable in that they can read from a wide range and can read with a moving member.

An embodiment of the present invention will be explained below based on FIG. 1 to FIG. 11. FIG. 1 shows a schematic configuration of an image rewriting system 100 according to an embodiment. In the present embodiment, for example, such an X, Y, and Z three-dimensional orthogonal coordinate system as shown in FIG. 1 is set, in which the Z axis direction is the vertical direction.

The image rewriting system 100 rewrites an image by irradiating a rewritable label held by a conveying container C with laser light, as will be described in detail below. A rewritable label may also be referred to as "RL" hereinafter.

Here, an "image" includes at least one kind of visible information such as characters, signs, lines, graphics, barcodes, and two-dimensional codes that indicates the content and the destination of the luggage contained in a container C, how many times the RL is used, etc. "Characters" include OCR characters that are read by OCR, i.e., optical character recognition. OCR characters include printed characters and handwritten characters.

Particularly, barcodes, two-dimensional codes, OCR characters, etc. are visible information to be read by a dedicated reading device, and may also be referred to as "scan image" in the following description. Further, in the following description, information that is included in an "image" and that is not a scan image may be referred to as "characters, etc." A "reading device" is a device configured to convert optical information of a barcode symbol, a two-dimensional symbol, characters, etc. to electric information, and may be a device including a decoder configured to convert electric information of a barcode symbol, a two-dimensional symbol, characters, etc. to character codes.

A RL is a thermally reversible recording medium that develops or fades color due to differences between heating and cooling processes, and contains a photothermal conversion material that generates heat upon absorption of laser light.

A container C has, for example, a RL, and in addition, a container body made of a rectangular parallelepiped box-like member having the RL attached to a side surface thereof. Here, a conveyed article, which is a target object to be conveyed, is a container body, but is not limited to this. In the following description, for the expediency, a container C and its content (luggage) may be together referred to as container C.

Here, the container body is a box-shaped receptacle. The material of the container body may be, for example, metal, resin, and cardboard. Among them, resin is preferable because resin has excellent durability, and is lightweight and easy to convey. Particularly, a polypropylene resin, an ABS resin (acrylonitrile-butadiene-styrene copolymerized synthetic resin), and a polyethylene resin are more preferable, because they can be produced at lower costs than other resins. The materials of the container body listed here are examples, and the material of the container body is not limited to these. Further, the container body may be a collapsible one that can be collapsed when nothing is put inside. A collapsible container body can be about "1/some number" the volume of a non-collapsible container body having the same size, and is very friendly for conveying.

As shown in FIG. 1, the image rewriting system 100 includes a conveyor device 10, two erasing devices 12A and 12B, a recording device 14, a stopping device 16, and a system control device 18. Note that a system including the conveyor device 10, the recording device 14, and part of the system control device 18 of the image rewriting system 100 may be referred to as an image recording system 150.

For example, the conveyor device 10 includes N (≥6) belt conveyor units as conveyor units provided at predetermined intervals in the X axis direction, and a support cradle 10a supporting the N belt conveyor units. In FIG. 1, from drawing constraints, only an X-axis-direction middle portion of the conveyor device 10 is illustrated. In the following description, the N belt conveyor units may also be referred to as BCU(1) to BCU (N) from −X side to +X side in their arranging order. The N belt conveyor units may also be generically referred to as BCU, when it is unnecessary to distinguish them.

Figure 2:
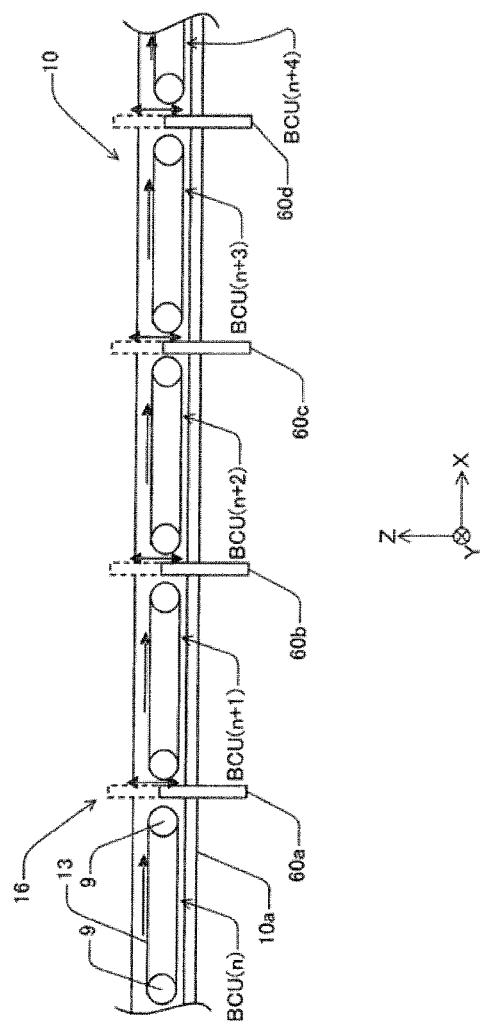
FIG. 2 is a diagram for explaining a conveyor device and a stopping device included in an image rewriting system.

For example, each BCU includes, for example, two rollers 9 which are spaced apart from each other in the X axis direction and of which axial direction is the Y axis direction, and an endless belt 13 wound over the two rollers 9, as shown in FIG. 2. Each roller 9 is supported on the support cradle 10a rotatably about the Y axis. Here, one of the two rollers 9 is a driving roller, and the other is a driven roller. The driving rollers of the respective BCUs are individually driven and controlled by the system control device 18 via a driving device (not shown) including a motor, etc. (see FIG. 5).

The X axis direction dimension of each BCU is set to about the same or twice as large as the X axis direction dimension of the container C, for example. Further, the top surfaces of the BCUs are on a common plane parallel with the X-Y plane.

The conveyor device 10 configured as described above conveys a container C in the +X direction (a predetermined conveying direction) by passing the container C between two adjoining BCUs. That is, the conveyor device 10 conveys a plurality of containers C in the +X direction by turns along a conveying path extended in the X axis direction and formed on the N BCUs. While a container C is being conveyed, the system control device 18 stops conveying the container C at a BCU on which the container C is being mounted, by appropriately stopping driving this BCU.

Hence, the driving device mentioned above is preferably a device that can adjust the rotation speed of the driving roller. In this case, behaviors of the container C at the start of conveying and stop of conveying thereof can be stabilized, and the time taken for conveying the container C can be reduced. Further, the endless belt 13 of each BCU is preferably a belt having a high friction coefficient. In this case, slippage of the container C on the endless belt 13 at the start of conveying and stop of conveying thereof can be suppressed. As a result, the response of the container C when it starts to move and preciseness of the stop position thereof can be improved.

In terms of improving the conveying efficiency, the conveying speed of the container C is preferably 1 m/min or higher, more preferably 5 m/min or higher, and still more preferably 10 m/min or higher. In terms of preventing the image rewriting system 100 from growing in size, the conveying speed of the container C is preferably 200 m/min or lower, more preferably 100 m/min or lower, and still more preferably 50 m/min or lower. However, the conveying speed of the container C may be appropriately set according to necessity, and is not limited to the above ranges.

The two erasing devices 12A and 12B are provided, for example, side by side in the X axis direction on the −Y side of the conveyor device 10, i.e., on the −Y side of the conveying path described above. Here, the erasing device 12A is provided on the −X side, and the erasing device 12B is provided on the +X side.

In more detail, the two erasing devices 12A and 12B are provided at positions at which they face (match) adjoining two BCU(n) and BCU(n+1), respectively. Here, 2≤n≤N−4.

Figure 3:
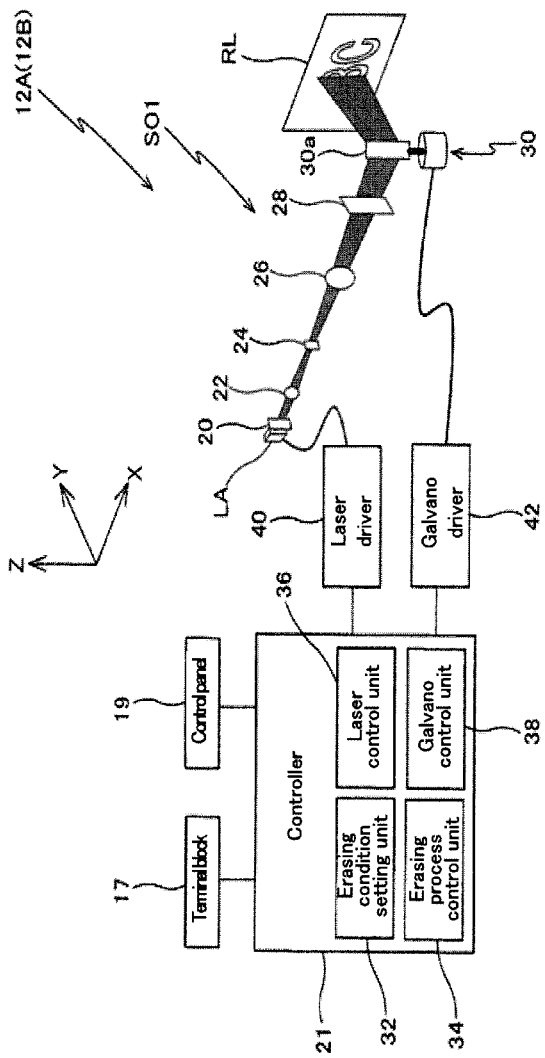
FIG. 3 is a diagram for explaining an erasing device included in an image rewriting system.

As shown in FIG. 3, the erasing devices each include a one-dimensional laser array LA including a plurality of laser diodes (semiconductor lasers) arranged in one dimension, an optical system SO1, a terminal block 17, a control panel 19, a controller 21, and a housing 12a (see FIG. 1). Though not so shown, the one-dimensional laser array LA, the optical system SO1, the terminal block 17, and the controller 21 are housed in the housing 12a, and the control panel 19 is provided on, for example, a side surface (or the top surface) of the housing 12a.

For example, the one-dimensional laser array LA includes a plurality of (e.g., 17) unillustrated laser diodes (semiconductor lasers) arranged side by side in the Z axis direction (in one-dimensional arrangement). Here, the distance in the Z axis direction between the laser diode on the most +Z side and the laser diode on the most −Z side is set to, for example, 10 mm. For example, the one-dimensional laser array LA emits line-shaped laser light of which cross-section extends in the Z axis direction to the +X side.

For example, the optical system SO1 includes a first cylindrical lens 20, a first spherical lens 22, a micro-lens array 24, a second spherical lens 26, a second cylindrical lens 28, and a galvano mirror device 30. In the following description, for the expediency, the first cylindrical lens 20, the first spherical lens 22, the micro-lens array 24, the second spherical lens 26, and the second cylindrical lens 28 may together be referred to as lens group.

The first cylindrical lens 20 is provided on the optical path of the line-shaped laser light emitted by the one-dimensional laser array LA, and slightly condenses this laser light in its width direction (i.e., a direction parallel with a direction orthogonal to the direction in which the plurality of laser diodes are arranged). Here, as the first cylindrical lens 20, a small-sized lens is provided in the proximity of the emission surface of the one-dimensional laser array LA.

The first spherical lens 22 is provided on the optical path of the line-shaped laser light that has passed through the first cylindrical lens 20, and condenses this laser light into the micro-lens array 24.

The micro-lens array 24 is provided on the optical path of the line-shaped laser light that has passed through the micro-lens array 22, and diffuses this laser light in its length direction (i.e., a direction parallel with the direction in which the plurality of laser diodes are arranged) to make the distribution of the light in the length direction uniform.

The second spherical lens 26 is provided on the optical path of the line-shaped laser light that has passed through the micro-lens array 24, and expands this laser light uniformly in the length direction and in the width direction.

The second cylindrical lens 28 is provided on the optical path of the line-shaped laser light that has passed through the second spherical lens 26, and slightly condenses this laser light in the width direction.

The galvano mirror device 30 is a galvanometer equipped with a swing mirror 30a that is configured to reflect the laser light and capable of making reciprocating swing motions. Here, for example, the swing mirror 30a is capable of swinging about the Z axis. The galvano mirror device 30 includes an angle sensor (not shown) configured to detect the rotation angle of the swing mirror 30a.

The galvano mirror device 30 is provided such that the swing mirror 30a is positioned on the optical path of the line-shaped laser light that has passed through the second cylindrical lens 28, and deflects this laser light roughly to the +Y side by reflecting the laser light while swinging about the Z axis.

Hence, the line-shaped laser light that has passed through the lens group is deflected by the galvano mirror device 30 to be emitted from an erasing laser light emission port (not shown) provided in the +Y-side side wall of the housing 12a to roughly the +Y side, i.e., to cross, for example, several centimeters to several ten centimeters above the conveyor device 10.

Through this, the line-shaped laser light emitted by the one-dimensional laser array LA is homogenized in the energy density and expanded in the length direction (Z axis direction) by the lens group, deflected roughly to the +Y side by the galvano mirror device 30, and applied to the conveyed article being located at a position on the conveyor device 10 that faces the erasing laser light emission port. As a result, the line-shaped laser light of which cross-section extends in the Z axis direction is scanned over the conveyed article in the X axis direction.

The terminal block 17 includes signal input terminals configured to receive an erasing start signal, an interlock signal, an ambient temperature signal, an encoder signal, etc. output by the system control device 18, and signal output terminals configured to output a ready-for-erasing signal, an erasing-going-on signal, a trouble-occurred signal, etc. to the system control device 18.

Here, the erasing start signal is a signal for the erasing device to start an erasing process. The interlock signal is a signal for urgently stopping an erasing process. The ambient temperature signal is a signal for correcting the laser power (output) depending on the ambient temperature. The encoder signal is a signal for detecting the moving speed of the rewritable label (work). The ready-for-erasing signal is a signal indicating that it is ready to receive an erasing start signal. The erasing-going-on signal is a signal indicating that erasing is being performed. The trouble-occurred signal is a signal indicating that the controller 21 has detected, for example, a trouble in the one-dimensional laser array LA, a trouble in the galvano mirror device 30, etc.

The control panel 19 is a user interface including a simple display and control switches, from which menus can be selected and numerical values can be entered. Here, for example, erasing conditions such as the scanning length of the laser light, the scanning speed of the laser light, the scanning direction of the laser light, laser power, an erasing start delay time, and a work speed can be designated from the control panel 19.

The controller 21 includes an erasing condition setting unit 32, an erasing process control unit 34, a laser control unit 36, a galvano control unit 38, etc.

The erasing condition setting unit 32 sets the erasing conditions such as the scanning length of the laser light, the scanning speed of the laser light, the scanning direction of the laser light, the laser power, the erasing start delay time and the work speed that are designated by the user from the control panel 19.

The erasing process control unit 34 processes input signals from the terminal block 17 to issue instructions to the laser control unit 36 and the galvano control unit 38, and also generates output signals to the terminal block 17.

The laser control unit 36 converts the output power value at which the laser is output that is instructed by the erasing process control unit 34 to an analog voltage and outputs it to a laser driver 40, and also generates a timing signal for igniting or extinguishing the laser.

The laser driver 40 is a circuit configured to generate a driving current for the one-dimensional laser array LA, and controls the laser power according to the value instructed by the laser control unit 36.

The galvano control unit 38 generates an analog signal for swinging the swing mirror 30a of the galvano mirror device 30 at a designated speed from a scanning start position instructed by the erasing process control unit 34 to a scanning end position likewise instructed by it, and outputs the analog signal to a galvano driver 42.

The galvano driver 42 is a circuit configured to control the swing angle of the swing mirror 30a of the galvano mirror device 30 according to the value instructed by the galvano control unit 38, and compares a signal from the angle sensor included in the galvano mirror device 30 with the value instructed by the galvano control unit 38 to output a drive signal to the galvano mirror device 30 in order to minimize the difference.

Returning to FIG. 1, the recording device 14 is provided, for example, on the −Y side of the conveyor device 10, i.e., on the −Y side of the conveying path, and on the +X side of the erasing device 12B.

In more detail, the recording device 14 is provided, for example, at a position facing (corresponding to) the BCU (n+3). That is, one BCU (n+2) is provided between the BCU (n+3) facing the recording device 14 and the BCU (n+1) facing (corresponding to) the erasing device 12B.

Figure 4:
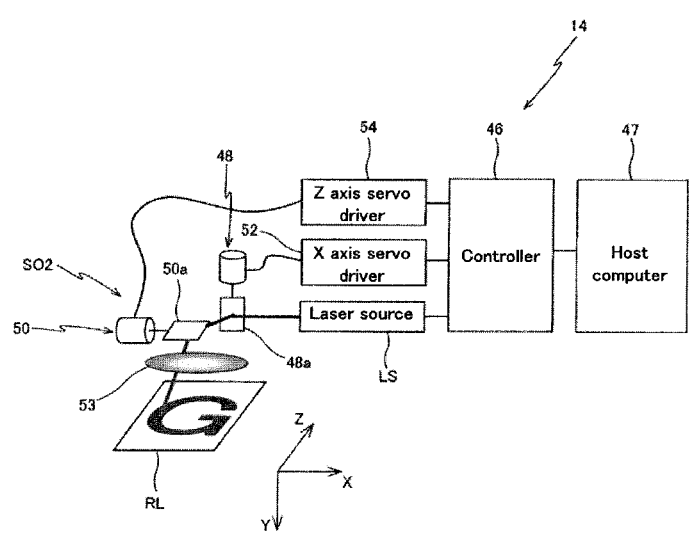
FIG. 4 is a diagram for explaining a recording device included in an image rewriting system.
Figure 5:
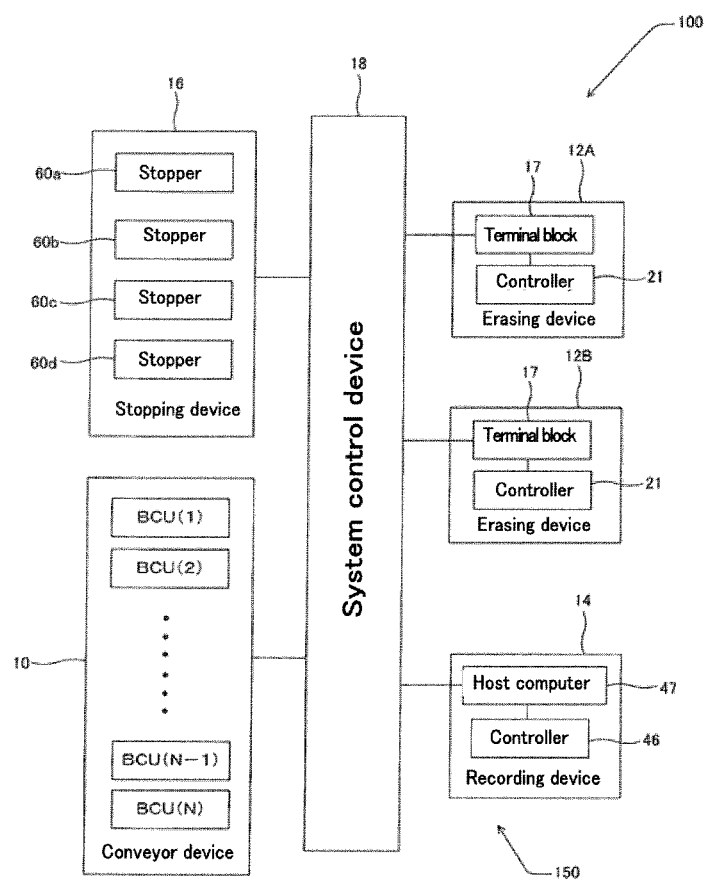
FIG. 5 is a block diagram showing the configuration of control of an image rewriting system.

As shown in FIG. 4, the recording device 14 includes, for example, a laser source LS including at least one (e.g., three) laser diode(s) (semiconductor laser(s)), an optical system SO2, a controller 46, a host computer 47, and a housing 14a (see FIG. 1) housing them.

For example, the laser source LS emits laser light in the −X direction.

For example, the optical system SO2 includes an X axis galvano mirror device 48, a Z axis galvano mirror device 50, and an fθ lens 53.

The X axis galvano mirror device 48 has the same configuration as the galvano mirror device 30 described above, except that a swing mirror 48a thereof swings about the Y axis.

For example, the X axis galvano mirror device 48 is provided such that the swing mirror 48a is positioned on the optical path of the laser light emitted by the laser source LS, and deflects this laser light roughly to the −Z side.

The Z axis galvano mirror device 50 has the same configuration as the galvano mirror device 30 described above, except that a swing mirror 50a thereof swings about the X axis.

For example, the Z axis galvano mirror device 50 is provided such that the swing mirror 50a is positioned on the optical path of the laser light deflected by the X axis galvano mirror device 48, and deflects this laser light roughly to the +Y side.

For example, the fθ lens 53 is provided on the optical path of the laser light deflected by the Z axis galvano mirror device 50, condenses this laser light onto the conveyed article located on its +Y side, and at the same time, performs correction to make the swing positions of the swing mirrors of the X axis and Z axis galvano mirror devices 48 and 50 proportional to the displacement of a light spot formed on the conveyed article.

The laser light that has passed through the fθ lens 53 is emitted from a recording laser light emission port (not shown) formed in the +Y-side side wall of the housing 14a to roughly +Y side, i.e., to cross, for example, several centimeters to several ten centimeters above the conveyor device 10.

Through this, the light emitted by the laser source LS is deflected by the X axis and Z axis galvano mirror devices 48 and 50 by turns, and through the fθ lens 53, applied to the conveyed article being located at a position on the conveyor device 10 that faces the recording laser light emission port. As a result, a light spot is scanned over the conveyed article two-dimensionally in the X axis and the Z axis.

The controller 46 generates drawing data composed of line segments based on image information output by the host computer 47, records (forms) an image on a recording target by controlling the swing positions of the swing mirrors of the X axis and Z axis galvano mirror devices 48 and 50 and the emission timing and emission power of the laser diodes. Here, for example, characters, numeric characters, signs, graphics, barcodes, etc. are recorded with a recording line width of about 0.25 mm.

The controller 46 controls the X axis galvano mirror device 48 via an X axis servo driver 52, and controls the Z axis galvano mirror device 50 via the Z axis servo driver 54.

The X axis servo driver 52 is a circuit configured to control the swing position of the swing mirror 48a of the X axis galvano mirror device 48 according to a value instructed by the controller 46, compares a signal from an angle sensor of the X axis galvano mirror device 48 with the value instructed by the controller 46, and outputs a drive signal to the X axis galvano mirror device 48 so as to minimize the difference.

Likewise, the Z axis servo driver 54 is a circuit configured to control the swing position of the swing mirror 50a of the Z axis galvano mirror device 50 according to a value instructed by the controller 46, compares a signal from an angle sensor of the Z axis galvano mirror device 50 with the value instructed by the controller 46, and outputs a drive signal to the Z axis galvano mirror device 50 so as to minimize the difference.

The stopping device 16 includes, for example, a plurality of (e.g., four) stoppers 60a to 60d, and a plurality of (e.g., four) Z actuators (not shown), as shown in FIG. 2.

The stoppers are each constituted by a flat plate member parallel with a Y-Z plane. The stopper 60a is provided between adjoining two BCU(n) and BCU(n+1) so as to be movable upward or downward with respect to the support cradle 10a. The stopper 60b is provided between adjoining two BCU(n+1) and BCU(n+2) so as to be movable upward or downward with respect to the support cradle 10a. The stopper 60c is provided between adjoining two BCU(n+2) and BCU(n+3) so as to be movable upward or downward with respect to the support cradle 10a. The stopper 60d is provided between adjoining two BCU(n+3) and BCU(n+4).

The four Z actuators are, for example, provided on the support cradle 10a so as to correspond to the four stoppers 60a to 60d, and can move the corresponding four stoppers 60a to 60d in the Z axis direction individually.

In more detail, the Z actuators can each move the corresponding stopper between a standby position (a retracted position) located on the -Z side of the top surface of the conveyor device 10 (i.e., the top surface of each BCU) and a protruded position (a stopping position) located on the +Z side of the top surface of each BCU by protruding therefrom.

The Z actuators may be, for example, an air cylinder, an oil cylinder, a solenoid, or, in sum, anything that can move the corresponding stoppers upward and downward. The four Z actuators are individually driven and controlled by the system control device 18.

The mechanism of recording and erasing an image to and from a rewritable label (RL) will be explained below.

This image recording and erasing mechanism is a mode of reversibly changing color tones by heat. This mode is constituted by a leuco dye and a reversible developer (hereinafter may also be referred to as "developer"). In this mode, color tones reversibly change between a transparent state and a color developed state by heat.

Figure 6A:
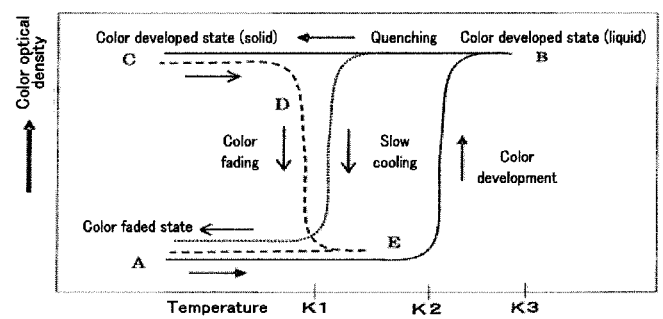
FIG. 6A is a graph showing a color developing and fading characteristic of a rewritable label (RL), which is a target of image rewriting by an image rewriting system.
Figure 6B:
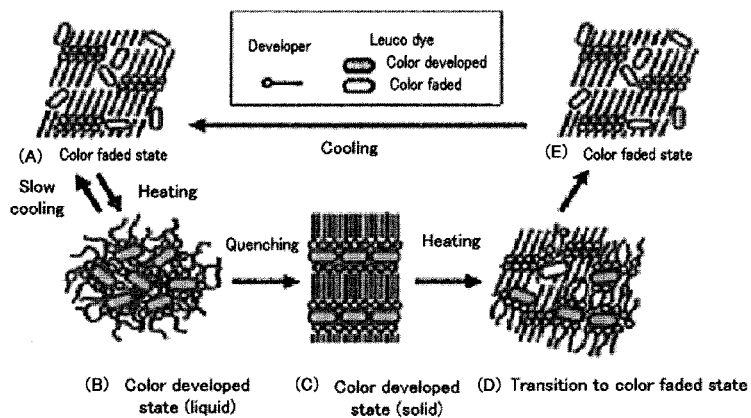
FIG. 6B is a diagram showing a mechanism of color developing and fading changes of a rewritable label.

FIG. 6A shows an example temperature vs. color optical density change curve of a thermally reversible recording medium that includes a thermally reversible recording layer containing a resin in which a leuco dye and a developer are added. FIG. 6B shows a color developing and fading mechanism of a thermally reversible recording medium, of which color faded state and color developed state are changed to each other reversibly by heat.

First, as the thermally reversible recording layer that is initially in a color faded state (A) is warmed, the leuco dye and the developer melt and mix with each other at a melting temperature K2, and the layer develops a color and becomes a melt color developed state (B). By quenching the layer from the melt color developed state (B), it is possible to cool the layer to room temperature while keeping it in the color developed state, to thereby bring the layer into a secure color developed state (C) in which the color developed state is stabilized.

Whether this color developed state can be obtained or not depends on the temperature lowering rate of lowering the temperature from the melt color developed state (B). Through slow cooling, color fading occurs in the process of lowering the temperature, to thereby bring about the same color faded state (A) as the initial state, or a state in which the density is relatively lower than the density obtained by quenching.

When the layer is warmed again from the color developed state (C), color fading occurs (from D to E) at a temperature K1 lower than the melting temperature K2. When the layer is cooled from this state, it returns to the same color faded state (A) as the initial state.

The color developed state (C) obtained by quenching from the melt state is a state in which the leuco dye molecules and the developer molecules have been mixed to be able to cause a contact reaction, in which state they often form a solid state. In this state, the molten mixture (i.e., the color developed mixture) of the leuco dye and the developer has crystallized while being kept in the color developed state. When this state is formed, it can be considered that the color development has been stabilized.

On the other hand, a color faded state is a state in which the leuco dye and the developer are phase-separated. This state is a state in which the molecules of at least one compound have aggregated and formed a domain or have crystallized, and is considered to be a state in which the leuco dye and the developer have been stabilized as separated from each other through the aggregation or crystallization. In many cases, a more complete color fading occurs when, like this, the leuco dye and the developer have phase-separated and the developer has crystallized.

In both of color fading by slow cooling from the melt color developed state (B) and color fading by warming from the color developed state shown in FIG. 6A, the aggregation structure changes at the temperature K1, and phase separation or crystallization of the developer occurs.

Further, in FIG. 6A, after the recording layer has been repeatedly warmed to a temperature K3 equal to or higher than the melting temperature K2, it might cause an erasing error of not being able to be erased by heating to the erasing temperature. This is considered to be because the developer has thermally decomposed to become less easily aggregable or crystallizable to thereby become less easily separable from the leuco dye. In order to prevent deterioration of the thermally reversible recording medium due to repeating, it may be good to reduce the difference between the melting temperature K2 and the temperature K3 shown in FIG. 6A when heating the thermally reversible recording medium. This can realize prevention of deterioration of the thermally reversible recording medium due to repeating.

Next, an example operation of the image rewriting system 100 will be explained with reference to FIG. 7A to FIG. 9C. The operation to be explained below is comprehensively controlled by the system control device 18. An unillustrated memory built in the host computer 47 pre-stores information representing an image to be recorded on a RL, i.e., image information representing, for example, characters, etc. and a barcode that indicate, for example, the content and destination information of a luggage contained in the container C, how many times the RL is used, etc. In FIG. 7A to FIG. 9C, the erasing devices and the recording device 14 are not illustrated.

n−1 containers C that each have a RL on which an image is pre-recorded and in each of which a luggage is contained have been individually mounted on the BCU(1) to the BCU(n−1) of the conveyor device 10 by an operator.

Here, each container C is mounted on the BCU such that a side surface of the container body on which the RL is attached comes to the −Y side, i.e., this side surface can face the laser light emission ports of the two erasing devices 12A and 12B and of the recording device 14. Note that FIG. 7A to FIG. 9C only show the X-axis-direction middle portion of the conveyor device 10, due to drawing constraints. In the following description, the n−1 containers C mounted on the conveyor device 10 may also be referred to as container C1 to container Cn−1 from +X side to −X side in their arranging order.

Initially, the four stoppers 60a to 60d are located at the standby positions (retracted positions).

First, the operator operates the control panel (not shown) of the system control device 18 to send a conveying start signal to the system control device 18.

Figure 7A:
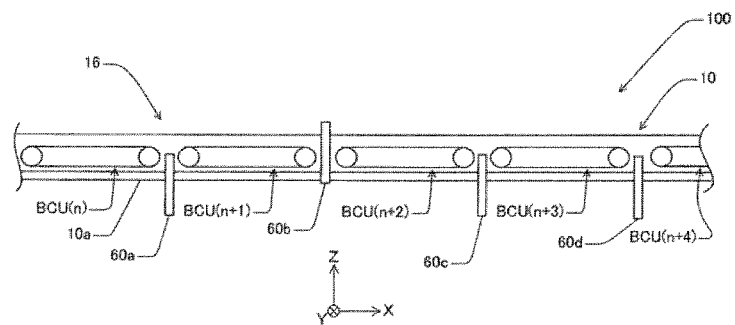
FIG. 7A is a diagram for explaining an operation of an image rewriting system (part 1).
Figure 7B:
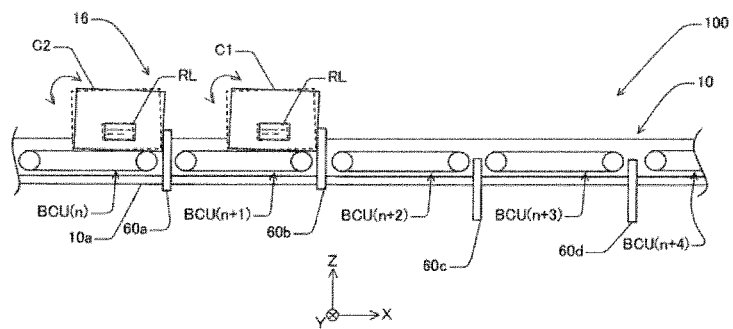
FIG. 7B is a diagram for explaining an operation of an image rewriting system (part 2).
Figure 7C:
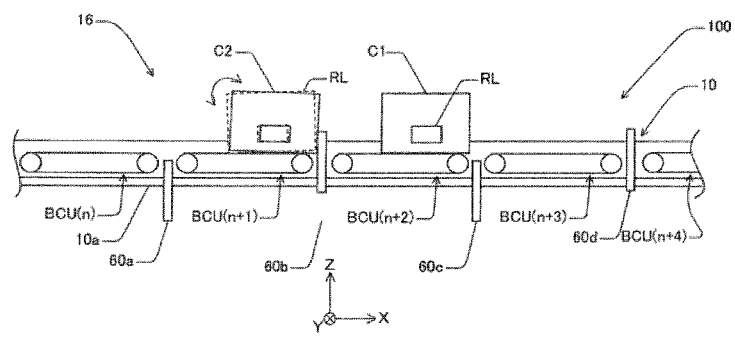
FIG. 7C is a diagram for explaining an operation of an image rewriting system (part 3).

The system control device 18 having received the conveying start signal starts driving the BCU(1) to BCU(n+1), and also moves the stopper 60b from the standby position (retracted position) to the protruded position (stopping position) (see FIG. 7A). As a result, the containers C are conveyed in the +X direction by being passed between adjoining two BCUs. Here, the time required to pass the container C between adjoining two BCUs is set to, for example, 0.6 seconds.

Here, for example, a photoelectric sensor (not shown) configured to detect a container C conveyed over the conveyor device 10 is provided at a position corresponding to, for example, the BCU(n−1). A detection signal from this photoelectric sensor is sent to the system control device 18. The system control device 18 includes a timer (not shown) to constantly take hold of the position of each container C, i.e., on which BCU the container C is located, based on the timing at which it received the detection signal from the photoelectric sensor and the time elapsed from this timing.

Then, the system control device 18 moves the stopper 60a from the standby position (retracted position) to the protruded position (stopping position) and also stops driving the BCU (1) to BCU(n+1), when the container C1 has been passed from BCU(n) to BCU(n+1) and the container C2 has been passed from BCU(n−1) to BCU(n). As a result, the container C1 is decelerated and stops by colliding on the stopper 60b (or is stopped by the stopper 60b), and the container C2 is decelerated and stops after colliding on the stopper 60a (or is stopped by the stopper 60a) (see FIG. 7B). That is, the conveyor device 10 decelerates the container C1 by observing the position at which it will collide on the stopper 60b as the target stop position, and decelerates the container C2 by observing the position at which it will collide on the stopper 60a as the target stop position. Here, the top end of each stopper located at the protruded position (stopping position) is located at a position lower than the center of gravity of the container C. In the present specification, "decelerating a container C by observing a predetermined position as a target stop position" means decelerating a container being conveyed such that the speed thereof becomes roughly zero (roughly stationary) at a predetermined downstream position.

When the container C1 collides on the stopper 60b, a drag moment from the stopper 60b that is pivoted on the top end of the stopper 60b to rotate about the Y axis in one direction and a gravitational moment rotating about the Y axis in the other direction act on the center of gravity of the container C1 to thereby cause the container C1 to vibrate about the Y axis. That is, the container C1 makes a motion of alternately repeating a forward-leaning posture and a backward-leaning posture. Likewise, when the container C2 collides on the stopper 60a, a drag moment from the stopper 60a that is pivoted on the top end of the stopper 60a to rotate about the Y axis in one direction and a gravitational moment rotating about the Y axis in the other direction act on the center of gravity of the container C2 to thereby cause the container C2 to vibrate about the Y axis. The vibrations of the containers C1 and C2 attenuate with the elapse of time. That is, some time is required for the containers to become stationary after they collide on the stoppers.

Here, the X-axis-direction position of the stopper 60b is adjusted with respect to the erasing device 12B such that when a container C collides on the stopper 60b, the RL of the container C may face the erasing device 12B precisely (see FIG. 1). The X-axis-direction position of the stopper 60a is adjusted with respect to the erasing device 12A such that when a container C collides on the stopper 60a, the RL of the container C may face the erasing device 12A precisely (see FIG. 1). That is, the stoppers 60a and 60b have a function of positioning the containers C at the positions facing the erasing devices 12A and 12B precisely respectively. "A container C facing an erasing device precisely" means that the RL of the container C faces the laser light emission port of the erasing device.

Next, an erasing start signal is output from the system control device 18 to the respective erasing devices.

The erasing devices having received the erasing start signal scan the RL of the container C facing themselves precisely with line-shaped laser light (e.g., with a length of 60 mm and a width of 0.5 mm) of which cross-section extends in the Z axis direction in the X axis direction at a predetermined speed for a predetermined time to thereby erase the image recorded on the RL. That is, the erasing devices irradiate the RL with laser light having a predetermined power to thereby erase the image recorded on the RL contactlessly. The erasing process to the RL by the respective erasing devices takes, for example, 1.5 seconds.

When the erasing process to the precisely facing container C is completed, the erasing devices output an erasing completed signal to the system control device 18.

In this way, the erasing process to the container C1 by the erasing device 12B and the erasing process to the container C2 by the erasing device 12A are performed in parallel.

The system control device 18 having received the erasing completed signals from the erasing devices moves the stoppers 60a and 60b from the protruded position (stopping position) to the standby position (retracted position), moves the stopper 60d from the standby position (retracted position) to the protruded position (stopping position), starts driving BCU (n) to BCU(n+3), and after this (e.g., 0.6 seconds after), starts driving BCU(1) to BCU(n−1).

Then, the system control device 18 stops driving BCU(n+1) when the container C1 has been passed from BCU(n+1) to BCU(n+2) and the container C2 has been passed from BCU(n) to BCU(n+1). As a result, the container C2 is decelerated and stops after colliding on the stopper 60b (or is stopped by the stopper 60b) (see FIG. 7C). That is, the conveyor device 10 decelerates the container C2 by observing the position at which it will collide on the stopper 60b as the target stop position. As a result, the container C2 vibrates about the Y axis.

Next, the system control device 18 stops driving BCU(n+2) and BCU(n+3) when the container C1 has been passed from BCU(n+2) to BCU(n+3). As a result, the container C1 is decelerated and stops after colliding on the stopper 60d (or is stopped by the stopper 60d) (see FIG. 8A). That is, the conveyor device 10 decelerates the container C1 by observing the position at which it will collide on the stopper 60d as the target stop position.

Figure 10:
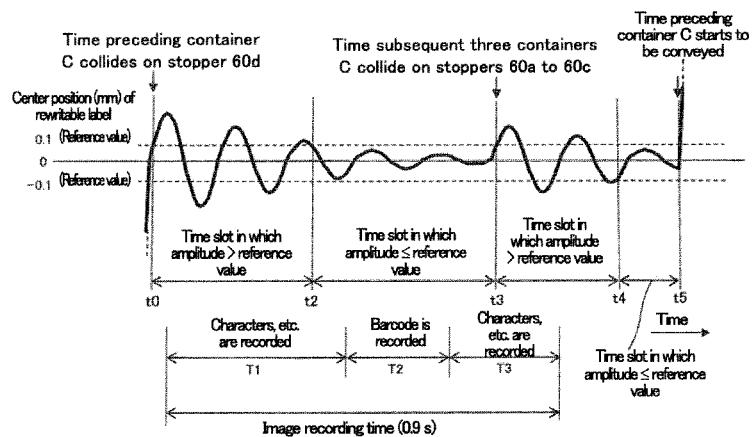
FIG. 10 is a graph showing temporal changes of amplitude of vibration of each container during image rewriting.

When the container C1 collides on the stopper 60d, a drag moment from the stopper 60d that is pivoted on the top end of the stopper 60d to rotate about the Y axis in one direction and a gravitational moment rotating about the Y axis in the other direction act on the center of gravity of the container C1 to thereby cause the container C1 to vibrate about the Y axis. That is, the container C1 makes a motion of alternately repeating a forward-leaning posture and a backward-leaning posture. The amplitude of this vibration becomes the maximum immediately after the container C1 collides on the stopper 60d, and becomes smaller with the elapse of time (see FIG. 10). That is, this vibration is a damped vibration. Here, as shown in FIG. 10, assuming that the time t0 at which the container C1 collides on the stopper 60d is 0 second, the amplitude of the container C1 will become equal to or smaller than a predetermined reference value (e.g., 0.1 mm) at the time t2 (e.g., 0.4 seconds).

Here, the X-axis-direction position of the stopper 60d is adjusted with respect to the recording device 14 such that when a container C collides on the stopper 60d, the RL of the container C may face the recording device 14 precisely. That is, the stopper 60d has a function of positioning a container C at a position facing the recording device 14 precisely. "A container C facing the recording device 14 precisely" means that the RL of the container C faces the laser light emission port of the recording device 14.

Then, the system control device 18 outputs a recording start signal to the recording device 14 in order to record an image on the container C1 facing the recording device 14 precisely, i.e., in order to apply a recording process.

If a recording process is applied to a container C that is vibrating, it is feared that this vibration influences the quality of the image to be recorded on the RL. Particularly, since a barcode included in the image to be recorded on the RL is information to be read by a reading device (e.g., a barcode scanner), the image quality required for the barcode is higher than that required for characters, etc.

That is, the bars of the barcode might be drawn out of place from the positions at which they should be drawn due to the vibration of the container C. Therefore, depending on the amplitude of the vibration, the grade (image quality) of the barcode when read by a reading device (e.g., a barcode scanner) might be significantly poor or the barcode might possibly be unreadable by a reading device. That is, the larger the amplitude of the vibration of the container C, the more deviated the drawn position of each bar. Therefore, the amplitude of the vibration can be said to be a major factor that influences the image quality of a barcode (readability of a barcode) to be recorded on the RL. It is conceivable to start a recording process to a container C when the vibration is damped completely, but this is not rational in terms of process efficiency.

Hence, for example, the recording device 14 having received a recording start signal firstly records characters. etc. on the RL of the container C1 within the time slot T1 from a time 0.1 seconds to a time 0.55 seconds (>the time t2), as shown in FIG. 10. Next, the recording device records a barcode with a bar width of, for example, 0.25 mm on the RL of the container C1 within the time slot T2 from the time 0.55 seconds to a time 0.75 seconds, i.e., while the vibration of the container C1 is equal to or smaller than the aforementioned reference value. Next, the recording device records characters, etc. on the RL of the container C1 within the time slot T3 from the time 0.75 seconds to a time 1 second. In this case, the time required for the recording process by the recording device 14 (image recording time) is, for example, 0.9 seconds. That is, here, the barcode is recorded within the latter half of the image recording time (from 0.45 seconds to 0.9 seconds). The image recording time is a period of time from a time at which recording of the image to be recorded on the RL is started to a time at which the recording is completed. In the present specification, the image recording time may also be referred to as "recording time".

In the present embodiment, the aforementioned reference value is set based on the image quality required for a barcode. That is, the reference value is set such that the image quality of a barcode reaches the required image quality when the barcode is recorded on the RL of a container C while the amplitude of the vibration of the container C precisely facing the recording device 14 is equal to or smaller than the reference value.

It is preferable to set the reference value more particularly according to, for example, the type of the barcode, the width of bars, etc.

The time at which the amplitude of the vibration when the container C is going to stop becomes equal to or smaller than the reference value varies depending on, for example, the weight of the container C, the height of the center of gravity of the container C with respect to the top end of the stopper, the conveying speed of the container C, etc. Therefore, it is desirable to measure this time beforehand by simulations (experiments).

Recording of an image onto the RL of the container C1 by the recording device 14 is performed by scanning the RL with spot-shaped laser light two-dimensionally in the X axis direction and Z axis direction in one stroke. That is, the recording device 14 records an image on the RL contactlessly by irradiating the RL with laser light having a predetermined power.

Meanwhile, when the container C1 has been passed from BCU(n+2) to BCU(n+3), the system control device 18 moves the stopper 60b from the protruded position (stopping position) to the standby position (retracted position), moves the stopper 60c from the standby position (retracted position) to the protruded position (stopping position), and starts driving BCU(n+1) and BCU(n+2).

Figure 8A:
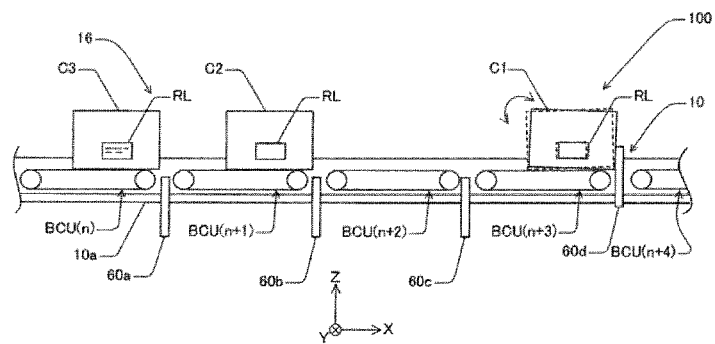
FIG. 8A is a diagram for explaining an operation of an image rewriting system (part 4).
Figure 8B:
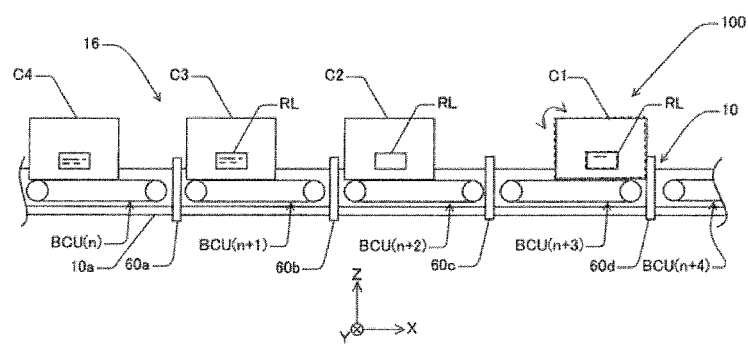
FIG. 8B is a diagram for explaining an operation of an image rewriting system (part 5).
Figure 8C:
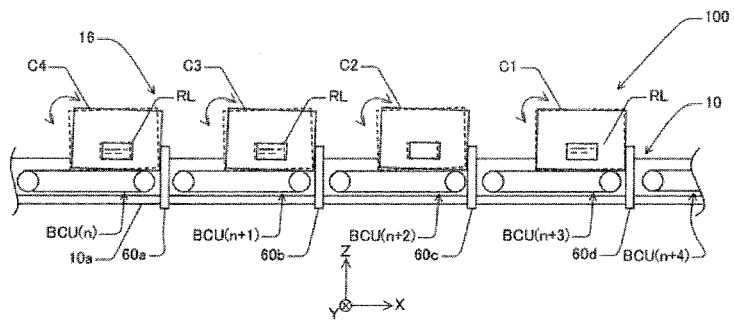
FIG. 8C is a diagram for explaining an operation of an image rewriting system (part 6).

Then, when the container C2 has been passed from BCU(n+1) to BCU(n+2), the container C3 has been passed from BCU(n) to BCU(n+1), and the container C4 has been passed from BCU(n−1) to BCU(n), the system control device 18 moves the stopper 60b from the standby position (retracted position) to the protruded position (stopping position) and stops driving BCU(1) to BCU(n+2) (see FIG. 8B). As a result, the containers C2, C3, and C4 are decelerated at the time t3 (e.g., 0.6 seconds) and stop almost at the same time after they collide on the stoppers 60c, 60b, and 60a (see FIG. 8C). That is, the conveyor device 10 decelerates the containers C2, C3, and C4 by observing the positions at which they will collide on the stoppers 60c, 60b, and 60a respectively as the target stop positions.

When the containers C2, C3, and C4 collide on the stoppers 60c, 60b, and 60a respectively, a drag moment from the corresponding stoppers 60c, 60b, and 60a that is pivoted on the top end of the stoppers to rotate about the Y axis in one direction and a gravitational moment rotating about the Y axis in the other direction act on the center of gravity of the containers C2, C3, and C4 to thereby cause the containers C2, C3, and C4 to vibrate about the Y axis. These vibrations have almost the same phase to be thereby synthetically transmitted to the container C1 currently subject to the recording process via the conveyor device 10 (see FIG. 10).

The vibrations transmitted to the container C1 become the maximum, i.e., exceed the aforementioned reference value (e.g., 0.1 mm) immediately after the containers C2, C3, and C4 collide on the stoppers 60c, 60b, and 60a respectively, and attenuate with the elapse of time (see FIG. 10). Here, the amplitude of the container C1 becomes equal to or smaller than the aforementioned reference value at the time t4 (e.g., 1.1 seconds).

After the containers C3 and C4 have collided on the stoppers 60b and 60a respectively, the system control device 18 outputs an erasing start signal to the erasing devices. The two erasing devices 12A and 12B having received the erasing start signal perform an erasing process to the container C4 and C3 in the same manner as the erasing process to the containers C1 and C2 (see FIG. 8C to FIG. 9C).

Then, the system control device 18 moves the stoppers 60c and 60d from the protruded position (stopping position) to the standby position (retracted position) and starts driving BCU (n+2) to BCU(N) at the time t5 (e.g., 1.2 seconds) (see FIG. 9A), and after the container C2 has been passed from BCU (n+2) to BCU(n+3), stops driving BCU(n+2) and BCU(n+3). As a result, the container C2 is decelerated and stops by colliding on the stopper 60d (see FIG. 9B). That is, the conveyor device 10 decelerates the container C2 by observing the position at which it will collide on the stopper 60d as the target stop position. As a result, the container C2 vibrates about the Y axis. Note that the container C1 is conveyed to the next step (e.g., a shipping preparation step) by BCU(n+4) to BCU(N).

Then, the system control device 18 outputs a recording start signal to the recording device 14. The recording device 14 having received the recording start signal performs a recording process to the container C2 in the same manner as the recording process to the container C1 (see FIG. 9C).

Figure 9A:
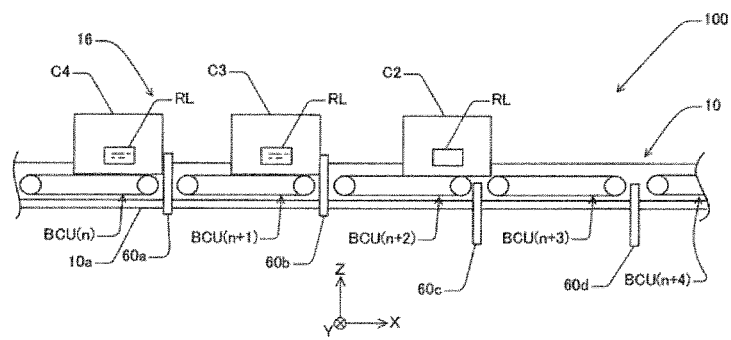
FIG. 9A is a diagram for explaining an operation of an image rewriting system (part 7).
Figure 9B:
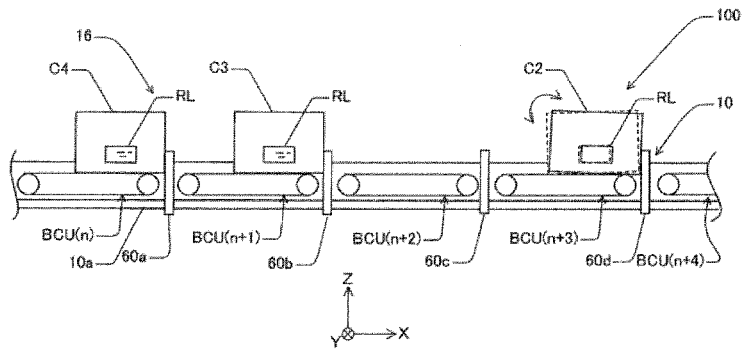
FIG. 9B is a diagram for explaining an operation of an image rewriting system (part 8).
Figure 9C:
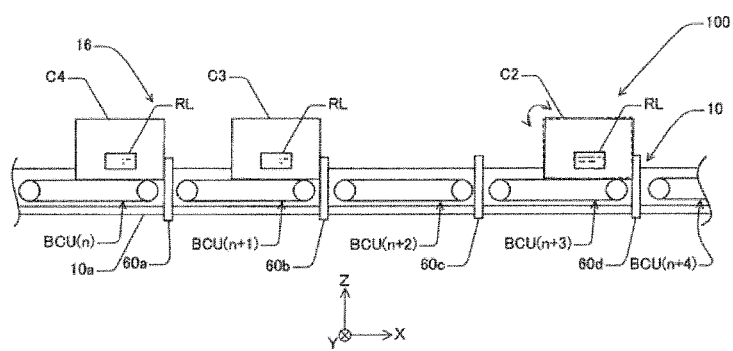
FIG. 9C is a diagram for explaining an operation of an image rewriting system (part 9).

In this way, the erasing process to the container C3 by the erasing device 12B, the erasing process to the container C4 by the erasing device 12A, and the recording process to the container C2 by the recording device 14 are preformed in parallel (see FIG. 9C).

After this, a recording process to the containers C3 and C4 and an erasing process and a recording process to the containers C5 to Cn−1 are performed in the same manner. The containers C finished with image rewriting are conveyed to the next step (e.g., a shipping preparation step) by BCU(n+3) to BCU(N).

Figure 11:
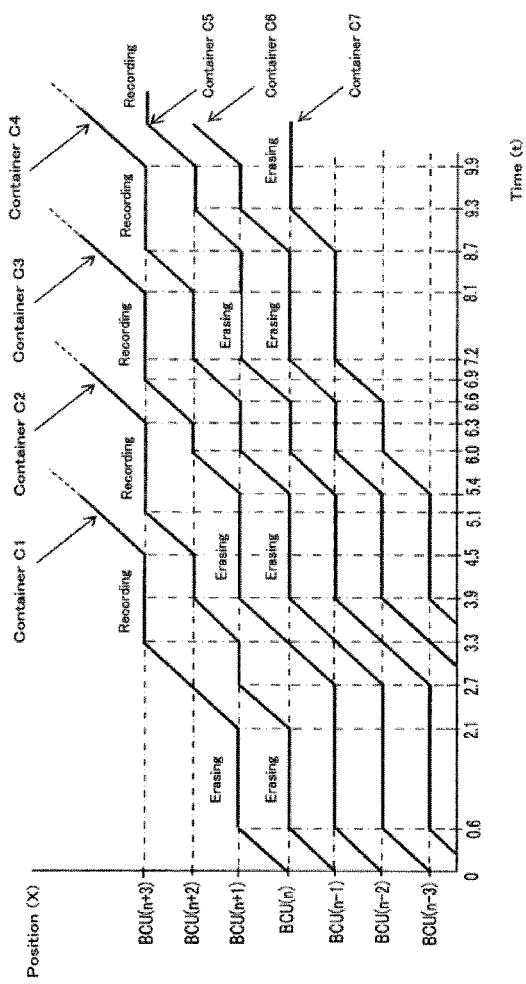
FIG. 11 is a time chart of the position of each container during image rewriting.

FIG. 11 shows a time chart about the positions of the respective containers during image rewriting. In FIG. 11, the time at which conveyance of the n−1 containers C is started is the time t=0 second. In FIG. 11, from drawing constraints, the containers C8 to Cn−1 are not described.

As described above, the image rewriting system 100 performs image rewriting by stopping each of the plurality of containers C conveyed by turns in the X axis direction at a position precisely facing either of the two erasing devices 12A and 12B to apply an erasing process, and then stopping each of them at a position precisely facing the recording device 14 to apply a recording process. The containers C finished with image rewriting is conveyed to the next step (e.g., a shipping preparation step).

The image recording system 150 included in the image rewriting system 100 described above is an image recording system configured to record an image on a RL attached to a container C, and includes: the conveyor device 10 configured to convey the container C in the +X direction; and the recording device 14 provided on the −Y side of the conveyor device 10 and capable of recording the image onto the RL located at the facing position contactlessly. The image includes a barcode to be read by a reading device. The conveyor device 10 decelerates the container C by observing a position at which the RL will face the recording device 14 as the target stop position. After the container C reaches the target step position, the recording device 14 records a barcode on the RL when the amplitude of the vibration of the container C is equal to or smaller than the reference value.

In this case, it is possible to suppress deviation of the drawn position of each bar of a barcode to a degree at which the bar is readable by a reading device.

Consequently, with the image recording system 150, the quality (image quality) of a scan image to be recorded on a RL can match or excel a level readable by a reading device.

Further, the image recording system 150 starts recording an image onto a RL of a container C in a time slot in which the amplitude of the vibration of the container C when the container C is going to stop is greater than the reference value. Therefore, it is possible to suppress degradation of process efficiency.

Further, of the image recording time, which is a period of time in which an image is recorded on a container C, the image recording system 150 records a barcode within a time slot T2 that is from a time (e.g., 0.55 seconds), which is ΔTa seconds (e.g., 0.15 seconds) after the time t2 (e.g., 0.4 seconds) at which the amplitude of the vibration of the container C becomes equal to or smaller than the reference value, to a time (e.g., 0.75 seconds), which is ΔTb seconds (e.g., 0.1 seconds) before the time t3 (e.g., 0.85 seconds) at which the amplitude exceeds the reference value (see FIG. 10).

In this case, even if the time t2 slightly fell behind the expected time, recording of a barcode could be started while the amplitude of the vibration of the container C is equal to or smaller than the reference value. Further, even if the time t3 at which another container C subsequent to the container C collides on the stopper came slightly earlier than the expected time, recording of the barcode could be completed while the amplitude of the vibration of the container C is equal to or smaller than the reference value. The larger the value of ΔTa, the more secure it becomes to be able to start recording of a barcode while the amplitude of the vibration of the container is equal to or smaller than the reference value. The larger the value of ΔTb, the more secure it becomes to be able to complete recording of the barcode while the amplitude of the vibration of the container is equal to or smaller than the reference value.

Further, with the image rewriting system 100, after a predetermined time (e.g., 0.6 seconds) has passed from when one container C collides on the stopper 60d configured to stop a container at a position precisely facing the recording device 14, subsequent three other containers C collide on the stoppers 60a to 60c. In this case, it is when the amplitude of the vibration of the one container C when it is going to stop has become small that the vibrations of the other containers C are transmitted to the one container C via the conveyor device 10.

Therefore, the amplitude of the vibration of the one container can be suppressed as much as possible from being multiplied.

The image rewriting system 100 includes the image recording system 150 and the two erasing devices 12A and 12B provided on the −X side of the recording device 14 (at the upstream side in the conveying direction of the container C) apart from each other in the X axis direction.

In this case, it is possible to subject two containers C conveyed by turns by the conveyor device 10 to an erasing process by the two erasing to devices 12A and 12B in parallel, and after this, to a recording process by the recording device 14 that takes a shorter process time than the erasing process by turns. This enables the availability of the recording device 14 to be improved, and as a result, enables the process efficiency of the image recording system 150 (the process efficiency of the image rewriting system 100) to be improved.

Here, a case can be assumed in which the image quality required for at least a portion of characters, etc. to be recorded on a RL is relatively high.

Figure 12:
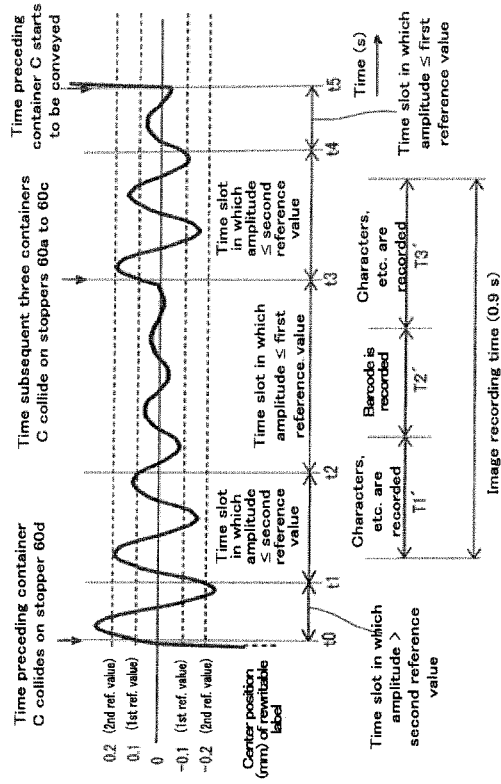
FIG. 12 is a graph showing temporal changes of amplitude of vibration of each container during image rewriting according to a modified example.

Hence, as in a modified example shown in FIG. 12, a plurality of (e.g., two) reference values may be set for the amplitude of the container C during image recording to the container C.

That is, in the modified example shown in FIG. 12, for example, a barcode is recorded on a container C while the amplitude of the vibration of the container C is equal to or smaller than a first reference value, and characters, etc. are recorded on the container C while the amplitude is equal to or lower than a second reference value.

Here, the first reference value is set to, for example, 0.1 mm based on the image quality required for barcodes, i.e., based on the required image quality described above, and the time t2 at which the amplitude of the vibration of a container C becomes equal to or smaller than the first reference value is, for example, 0.2 seconds. The second reference value is set to, for example, 0.2 mm based on the image quality required for characters, etc., and the time t1 at which the amplitude of the vibration of a container C becomes equal to or smaller than the second reference value is, for example, 0.1 seconds.

Specifically, while one container C is within the time slot T1 that is from a time 0.15 seconds (>t1) to a time 0.3 seconds (>t2), i.e., while the amplitude of the vibration of the one container C is equal to or smaller than the second reference value (e.g., 0.2 mm), characters, etc. are recorded on the RL of the one container C. Then, while the one container C is within the time slot T2 that is from the time 0.3 seconds to a time 0.5 seconds, i.e., while the amplitude of the vibration of the one container C is equal to or smaller than the first reference value (e.g., 0.1 mm), a barcode is recorded on the RL of the one container C.

Next, within the time slot T3 from the time 0.5 seconds to a time 1.05 seconds, characters, etc. are recorded on the RL of the one container C. That is, the image recording time is 0.9 seconds. In this case, at the time t3 (e.g., 0.6 seconds), three other containers C subsequent to the one container C collide on the stoppers 60a to 60c almost at the same time and vibrate about the Y axis. A vibration synthesized from these vibrations is transmitted to the one container C subject to the recording process via the conveyor device 10. The maximum value of the amplitude of this vibration is equal to or smaller than the second reference value (e.g., 0.2 mm) and equal to or larger than the first reference value (e.g., 0.1 mm) (see FIG. 12). The amplitude of this vibration becomes equal to or smaller than the first reference value at the time t4 (e.g., 1.1 seconds).

Therefore, in the modified example shown in FIG. 12, it is possible to record characters, etc. on the RL of a container C while the amplitude of the vibration of the container C is relatively small, which makes it possible to securely bring the image quality of the characters, etc. recorded on the RL to the required image quality or higher. Further, it is possible to record a barcode on the RL of a container C while the amplitude of the vibration of the container C is small, which makes it possible to securely bring the image quality of the barcode recorded on the RL to the required image quality or higher. That is, it is possible to securely improve the quality of the image recorded on the RL.

For example, at least one other reference value different from the first and second reference values may be set based on the image quality required for information (characters, etc. and a barcode) included in an image to be recorded on a RL.

Specifically, for example, when plural sets of characters, etc. for which different image qualities are required are included in an image to be recorded, a third reference value that is larger than the first reference value and smaller than the second reference value may be set. Then, for example, while the amplitude of the vibration of a container C is larger than the third reference value and equal to or smaller than the second reference value, a portion of the plural sets of characters, etc. (characters, etc. for which a lower image quality is required) may be recorded on the RL of the container C. While the amplitude of the vibration of the container C is larger than the first reference value and equal to or smaller than the third reference value, the remaining portion of the plural sets of characters, etc. (characters, etc. for which a higher image quality is required) may be recorded on the RL of the container C.

Further, for example, when a plurality of barcodes for which different image qualities are required are included in an image to be recorded, a third reference value that is smaller than the first reference value may be set, for example. Then, for example, while the amplitude of the vibration of the container C is equal to or smaller than the third reference value, a portion of the plurality of barcodes (a barcode for which a higher image quality is required) may be recorded on the RL of the container C. While the amplitude of the vibration of the container C is larger than the third reference value and equal to or smaller than the first reference value, the remaining portion of the plurality of barcodes (a barcode for which a lower image quality is required) may be recorded on the RL of the container C.

In these cases, characters, etc. and a barcode are recorded on a RL while the amplitude of the vibration of the container C is relatively small. Therefore, it is possible to prevent the RL from being deteriorated by being heated excessively through plural times of scanning over a specific portion of the RL.

In the embodiment and modified example described above, the stopping device 16 including the four stoppers 60a to 60d is provided. However, it needs not be provided. In this case, a container C will be stopped at a position precisely facing the erasing devices and the recording device 14 only by means of driving control on the conveyer device 10 by the system control device 18.

In this case, when a container C is going to stop, a frictional force moment from the BCU that is pivoted on a +X-side and −Z-side corner of the container C to rotate about the Y axis in one direction and a gravitational moment rotating about the Y axis in the other direction act on the center of gravity of the container C. As a result, the container C vibrates about the Y axis. The larger the deceleration of the container C, the larger the maximum value of the amplitude of this vibration (damped vibration). Also in this case, as in the embodiment and modified example described above, it is possible to improve the quality of the image to be recorded on the RL of the container, by adjusting the time slot in which information is recorded according to the image quality required for information included in the image to be recorded on the RL of the container C by the recording device 14. In the present specification, the target stop position of a container C may be an arbitrary position within a region in which the RL of the container C faces the laser light emission port of the recording device 14 and the laser light emission ports of the erasing devices.

In the embodiment and modified example described above, the stopping device 16 includes four stoppers 60a to 60d. However, the number is not limited to this. For example, the stopping device needs not include the stopper 60c provided between BCU(n+2) and BCU(n+3). Further, for example, a stopper may also be provided between at least one set of adjoining two BCUs, in addition to the respective sets of adjoining two BCUs between which the four stoppers 60a to 60d are provided respectively, In the embodiment and modified example described above, the top end of each stopper is lower in height than the center of gravity of a system including a container C and its content. However, it may be higher than the center of gravity. In this case, when going to stop by colliding with each stopper, a container C causes a vibration that is to be damped in the X axis direction. The larger the deceleration of the container C, the larger the maximum value of the amplitude of this damped vibration. Also in this case, as in the embodiment and modified example described above, it is possible to improve the quality of the image to be recorded on the RL of the container C by adjusting the time slot in which information is recorded based on the image quality required for information included in the image to be recorded on the RL of the container C by the recording device 14.

Further, in the embodiment and modified example described above, an image (characters, etc. and a barcode) is recorded on a container C in a time from t0 to t4. For example, a portion of characters, etc. or a barcode may also be recorded in a time slot from the time t4 to the time t5.

Further, for example, an image sensor may be provided at a position corresponding to between the erasing device 12B and the recording device 14, i.e., a position corresponding to BCU(n+2), in order to detect the density of an image on a RL to which an erasing process has been applied by either of the two erasing devices 12A and 12B. Based on a detection result from the image sensor, when the density of an image recorded on the RL of a container C located on BCU(n+2) is equal to or smaller than a predetermined value, the container C may be conveyed to BCU(n+3) corresponding to the recording device 14 so that a recording process may be applied to the container C, whereas when the density of the image recorded on the RL of the container C is higher than the predetermined value, the container C may be taken away manually, for example. As a result, a recording process can be applied to only such containers C from which images have been infallibly erased by the erasing devices, which leads to prevention of image rewriting errors. It is preferable that the X-axis-direction position of the stopper 60c with respect to the image sensor be adjusted such that a container C may be stopped at a position on BCU(n+2) that precisely faces the image sensor. Also in this case, the vibration of a container C when it collides on the stopper 60c is transmitted to a preceding container C currently subject to a recording process via the conveyor device 10.

In the embodiment and modified example described above, a barcode is recorded on the RL of a container C when a time taken for the amplitude of vibration of a container C when it collides on a stopper to become equal to or smaller than the reference value has passed after the collision. The present invention is not limited to this. For example, a vibration sensor for detecting the amplitude of vibration of a container C may be provided on the conveyor device 10, and a detection result from the vibration sensor may be monitored, so that when the detection result becomes equal to or smaller than a reference value, a barcode may be recorded on the RL of the container C.

Further, the number of erasing devices and recording devices in the image rewriting system is not limited to the number described in the embodiment. For example, the number of erasing devices may be 1, or 3 or greater. The number of recording devices may be 2 or greater. The number of recording devices may be greater than the number of erasing devices.

In the embodiment and modified example described above, a barcode is employed as information to be recorded on the RL of a container C while the amplitude of vibration of the container C is equal to or smaller than the reference value (or the first reference value). Instead of or in addition to this, for example, a portion of characters, etc. for which a particularly high image quality is required (for which a predetermined level of or higher image quality is required), or for example, such information as two-dimensional code such as a QR code (Registered Trademark) that is to be read by a reading device (information for which a predetermined level of or higher image quality is required) may be employed. Then, for example, a predetermined level, which is a reference for whether the required image quality is high or low, may be changed according to size, type, and line width of characters, etc., a barcode, and a two-dimensional code to be recorded on a RL, capability (e.g., reading resolution) of a reading device, etc. In this case, it is preferable that the higher the predetermined level, the lower the reference value be set.

In the embodiment and modified example described above, an image to be recorded to a RL includes plural pieces of information. The present invention is not limited to this. In sum, it is only necessary that an image to be recorded include at least one piece of information for which a predetermined level of or higher image quality is required.

In the embodiment and modified example described above, a reading device having a barcode reading function (e.g. a barcode scanner) is employed. The present invention is not limited to this. For example, a reading device having an optical character recognition function in addition to a barcode reading function or a reading device including software having this function may be employed, so that the barcode information may be converted to character data that can be processed by a computer.

In the embodiment and modified example described above, a flat plate member is used as the stoppers. The present invention is not limited to this. Any other member may be used instead as long as it can stop a container C at a position precisely facing the erasing devices or the recording device. A preferable example of the member to be used as the stoppers is a member that can absorb a certain amount of the energy of collision with a container C (i.e., does not have so high a coefficient of restitution), and that is excellent in a container C positioning precision.

In the embodiment and modified example described above, after one container C is made to collide on the stopper 60d, subsequent three other containers C are made to collide on the corresponding stoppers. The present invention is not limited to this. For example, the one container C and the subsequent three other containers C may be made to collide on the corresponding stoppers at the same time. Further, for example, of the subsequent three other containers C, at least two other containers C may be made to collide on the corresponding stoppers at different timings.

In the embodiment and modified example described above, BCUs (belt conveyor units) are employed as the plurality of conveyor units included in the conveyor device 10. The present invention is not limited to this. For example, a roller conveyor unit including a plurality of rollers that are arranged side by side in the X axis direction and of which axial direction is the Y axis direction may be employed. This roller conveyor unit is configured like a belt conveyor unit from which the endless belt is removed. Preferred examples of the plurality of rollers of the roller conveyor unit are those that have a high friction coefficient on their outer circumferential surface.

In the embodiment and modified example described above, the conveyor device 10 is employed as a conveyor device. The present invention is not limited to this and may be modified appropriately. For example, a device obtained by combining a belt conveyor unit and a roller conveyor unit may be employed as a conveyor device. Specifically, a belt conveyor unit that is capable of precisely controlling the position of a container C may be used in a conveying region including the position at which a RL precisely faces the recording device 14, in which region precision is required for positioning a container C on the conveying path, whereas a roller conveyor unit having a simple configuration and excellent in durability may be used in a conveying region in which not so high a precision is required for positioning a container C on the conveying path. Further, when the conveying speed of a conveyed article is relatively low, the conveyor device may be configured only by a roller conveyor unit.

In the embodiment and modified example described above, the plurality of BCUs of the conveyor device 10 are provided side by side in the X axis direction, i.e., on a line extending in the X axis direction. The present invention is not limited to this. For example, at least a part of the BCUs may be provided on a curve that is parallel with an X-Y plane.

In the embodiment and modified example described above, the recording device 14 is provided on one side (e.g., on the −Y side) of the conveyor device 10. However, it may be provided on the other side (e.g., on the +Y side) of the conveyor device 10, or may be provided on both sides (e.g., on the +Y side and −Y side) thereof. When the recording device 14 is provided on one side or the other side, a RL needs to be attached to a position on a container C that at least faces the recording device 14. When recording devices 14 are provided on both sides, a RL needs only to be attached to at least one of the positions on a container C that face the recording devices 14. When recording devices 14 are provided on both sides and a RL is attached to only one side of a container C, it is unnecessary to take care to bring the side of the container C to which the RL is attached to the side on which a recording device 14 is provided when mounting the container C on the conveyor device 10. Therefore, it is possible to prevent an error of no image having been recorded on the RL because of the difference of the side on which the recording device 14 is provided and the side to which the RL is attached.

In the embodiment and modified example described above, laser diodes are used as the lasers of the erasing devices and of the recording device. The present invention is not limited to this. For example, other types of lasers such as a solid-state laser, a fiber laser, and a $CO_2$ laser may be used.

In the embodiment and modified example described above, a configuration for erasing an image by irradiating a RL with laser light is employed as the erasing device. However, a configuration for erasing an image by bringing, for example, a heated roller or a heated plate into contact with a RL may be employed.

In the embodiment and modified example described above, a configuration for recording an image by irradiating a RL with laser light is employed as the recording device. However, a configuration for recording an image by bringing, for example, a thermal head into contact with a RL may be employed.

In the embodiment and modified example described above, the image recording system 150 is used as part of the image rewriting system 100. The present invention is not limited to this. For example, only the image recording system 150 may be used to convey a container C having a RL to which no image is recorded and perform a recording process to the container C.

Further, the numerical values such as distance, and time used in the embodiment and modified example are mere examples, and the present invention is not limited to these values.

In the embodiment and modified example described above, a container is employed as a conveyed article. The present invention is not limited to this. In sum, any object is possible as long as it can be conveyed by a conveyor device. For example, a receptacle other than a container, a packed article, etc. may be employed as a conveyed article. Furthermore, the material, shape, etc. of the conveyed article are not particularly limited.

EXAMPLES

Figure 14:
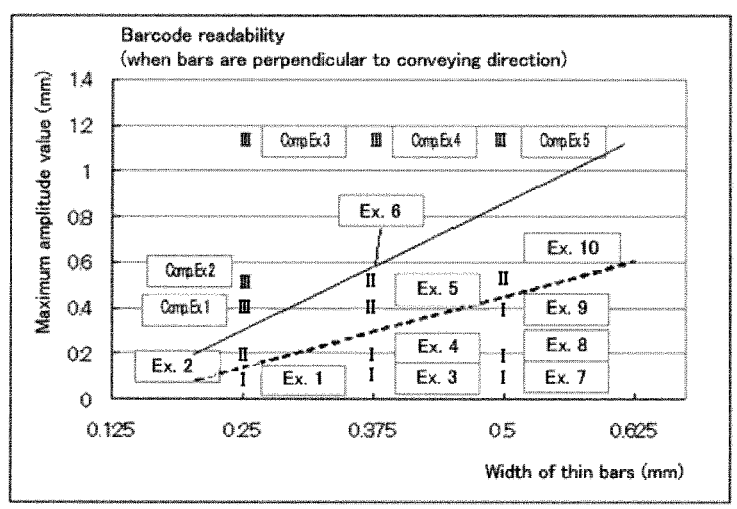
FIG. 14 is a graph showing a relationship between the width of a bar and the maximum amplitude value, when bars of a barcode are recorded perpendicularly to the conveying direction.
Figure 15:
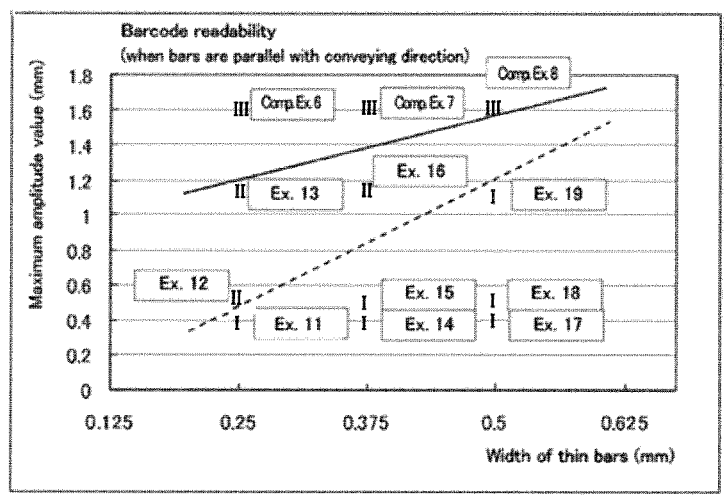
FIG. 15 is a graph showing a relationship between the width of a bar and the maximum amplitude value, when bars of a barcode are recorded in parallel with the conveying direction.
Figure 16:
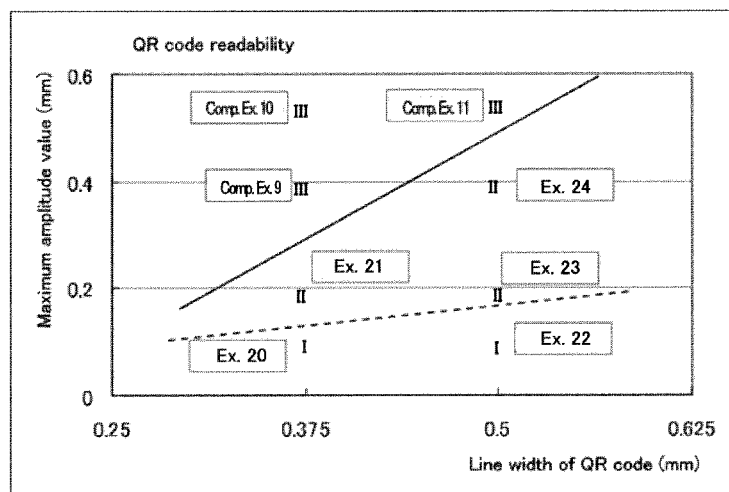
FIG. 16 is a graph regarding a QR code, showing a relationship between the line width of the QR code and the maximum amplitude value.

Specific examples will be explained below. Here, a container C (ORICON 32B manufactured by Sanko Co., Ltd.) was conveyed by the conveyor device 10 having a conveying speed of 100 mm/second, and the container C was decelerated with a predetermined position on the conveyor device 10 (a position precisely facing the recording device 14) observed as a target stop position. A relationship under these conditions, among a time taken for recording to the container to be started after the container C reached the target stop position, the maximum value of the amplitude of vibration in the X axis direction (conveying direction), and the readability of the barcode (INTERLEAVED TWO OF FIVE, 10 digits, width of thin bars of 0.25 mm, 0.375 mm, and 0.5 mm) is shown in Table 1 to Table 6. The relationship shown in Table 1 to Table 6 is also shown in FIG. 14 to FIG. 16. In FIG. 14 to FIG. 16, symbol I indicates a comprehensive grade of C (readable), symbol II indicates a comprehensive grade of D (readable) that is lower than the comprehensive grade C, and symbol III indicates that the barcode is unreadable (impossible to read).

Figure 13:
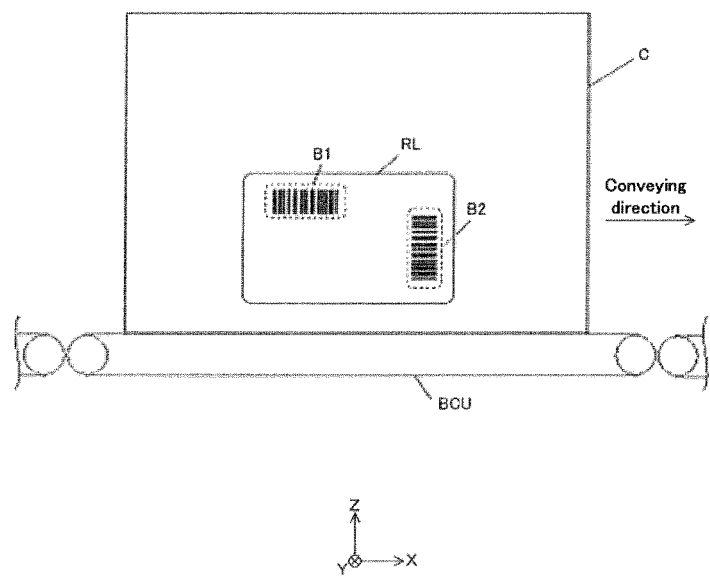
FIG. 13 is a diagram for explaining the orientation of barcodes recorded on a rewritable label (RL), with B1 showing a barcode of which bare are recorded perpendicularly to the conveying direction, and B2 showing a barcode of which bars are recorded in parallel with the conveying direction.

A barcode of which bars are drawn perpendicularly to the conveying direction is illustrated at B1 of FIG. 13, and a barcode of which bars are drawn in parallel with the conveying direction is illustrated at B2 of FIG. 13. A relationship among a time taken for recording to a container to be started after the container C reached the target stop position, the maximum value of the amplitude of vibration in the X axis direction (conveying direction), and the readability of a QR code (model 2) is shown in Table 7 and Table 8. As an amplitude measuring instrument, a laser displacement meter (LKH085 manufactured by Keyence Corporation, with a measuring distance range of 85±18 mm) was used, and vibration of the surface of the container C was measured from the downstream side in the X axis direction (from the +X side).

The values in the tables indicate the grades specified in ANSI X.182-1990 and JIS X0520 (Specifications for evaluation of barcode symbol printing quality). Grades of 1.5 or greater but less than 2.4 are classified as comprehensive grade C. Grades of 0.5 or higher but less than 1.4 are classified as comprehensive grade D. Grades of less than 0.5 are classified as comprehensive grade F.

TABLE 1

Comprehensive grade and readability ratio of barcode
(The width W of thin bars was 0.25 mm, and bars were drawn perpendicularly to the conveying direction.)

|  | Max. amplitude value (mm) | Comprehensive grade | Readability ratio |
|---|---|---|---|
| Example 1 | 0.087 | 2.0 | 97/100 |
| Example 2 | 0.185 | 0.1 | 6/100 |
| Comparative Example 1 | 0.383 | 0.0 | 0/100 |
| Comparative Example 2 | 0.526 | 0.0 | 0/100 |
| Comparative Example 3 | 1.128 | 0.0 | 0/100 |

As seen from Table 1, in Examples 1 and 2, the barcode was recorded while the amplitude was equal to or smaller than a reference value (2.2×W−0.25) mm, whereas in Comparative Examples 1 to 3, the barcode was recorded while the amplitude was larger than the reference value (2.2×W−0.25) mm. The reference value (2.2×W−0.25) mm is a linear function of the width W of the thin bars that is indicated by a solid line in FIG. 14.

Further, as seen from Table 1, in Example 1, the barcode was recorded while the amplitude was equal to or smaller than a reference value (1.2×W−0.15) mm. The reference value (1.2×W−0.15) mm is a linear function of the width W of the thin bars that is indicated by a broken line in FIG. 14.

As a result, in Example 1, reading (scanning) of the barcode was performed a hundred times, and the barcode could be successfully read 97 times. In Example 2, reading of the barcode was performed a hundred times, and the barcode could be successfully read 6 times. In Comparative Examples 1 to 3, reading of the barcode was performed a hundred times, and the barcode could not be read even once.

TABLE 2

Comprehensive grade and readability ratio of barcode
(The width W of thin bars was 0.375 mm, and bars were drawn perpendicularly to the conveying direction.)

|  | Max. amplitude value (mm) | Comprehensive grade | Readability ratio |
|---|---|---|---|
| Example 3 | 0.087 | 2.0 | 97/100 |
| Example 4 | 0.185 | 2.0 | 97/100 |
| Example 5 | 0.383 | 1.8 | 97/100 |
| Example 6 | 0.526 | 0.8 | 65/100 |
| Comparative Example 4 | 1.128 | 0.0 | 0/100 |

As seen from Table 2, in Examples 3 to 6, the barcode was recorded while the amplitude was equal to or smaller than the reference value (2.2×W−0.25) mm, whereas in Comparative Example 4, the barcode was recorded while the amplitude was larger than the reference value (2.2×W−0.25) mm.

Further, as seen from Table 2, in Examples 3 and 4, the barcode was recorded while the amplitude was equal to or smaller than the reference value (1.2×W−0.15) mm.

As a result, in Examples 3 to 5, reading (scanning) of the barcode was performed a hundred times, and the barcode could be successfully read 97 times. In Example 6, reading of the barcode was performed a hundred times, and the barcode could be successfully read 65 times. In Comparative Example 4, reading of the barcode was performed a hundred times, and the barcode could not be read even once.

TABLE 3

Comprehensive grade and readability ratio of barcode
(The width W of thin bars was 0.5 mm, and bars were drawn perpendicularly to the conveying direction.)

|  | Max. amplitude value (mm) | Comprehensive grade | Readability ratio |
|---|---|---|---|
| Example 7 | 0.087 | 2.0 | 100/100 |
| Example 8 | 0.185 | 2.0 | 100/100 |
| Example 9 | 0.383 | 1.5 | 87/100 |
| Example 10 | 0.526 | 1.2 | 85/100 |
| Comparative Example 5 | 1.128 | 0.0 | 0/100 |

As seen from Table 3, in Examples 7 to 10, the barcode was recorded while the amplitude was equal to or smaller than the reference value (2.2×W−0.25) mm, whereas in Comparative Example 5, the barcode was recorded while the amplitude was larger than the reference value (2.2×W−0.25) mm.

Further, as seen from Table 3, in Examples 7 and 9, the barcode was recorded while the amplitude was equal to or smaller than the reference value (1.2×W−0.15) mm.

As a result, in Examples 7 and 8, reading (scanning) of the barcode was performed a hundred times, and the barcode could be successfully read a hundred times. In Example 9, reading of the barcode was performed a hundred times, and the barcode could be successfully read 87 times. In Example 10, reading of the barcode was performed a hundred times, and the barcode could be successfully read 85 times. In Comparative Example 5, reading of the barcode was performed a hundred times, and the barcode could not be read even once.

TABLE 4

Comprehensive grade and readability ratio of barcode
(The width W of thin bars was 0.25 mm, and bars were drawn in parallel with the conveying direction.)

|  | Max. amplitude value (mm) | Comprehensive grade | Readability ratio |
|---|---|---|---|
| Example 11 | 0.383 | 2.0 | 100/100 |
| Example 12 | 0.526 | 0.8 | 70/100 |
| Example 13 | 1.128 | 0.8 | 68/100 |
| Comparative Example 8 | 1.615 | 0.0 | 0/100 |

As seen from Table 4, in Examples 11 to 13, the barcode was recorded while the amplitude was equal to or smaller than a reference value (1.3×W+0.88) mm, whereas in Comparative Example 6, the barcode was recorded while the amplitude was larger than the reference value (1.3×W+0.88) mm. The reference value (1.3×W+0.88) mm is a linear function of the width W of the thin bare that is indicated by a solid line in FIG. 15.

Further, as seen from Table 4, in Example 11, the barcode was recorded while the amplitude was equal to or smaller than a reference value (2.7×W−0.18) mm. The reference value (2.7×W−0.18) mm is a linear function of the width W of the thin bars that is indicated by a broken line in FIG. 15.

As a result, in Example 11, reading (scanning) of the barcode was performed a hundred times, and the barcode could be successfully read a hundred times. In Example 12, reading of the barcode was performed a hundred times, and the barcode could be successfully read 70 times. In Example 13, reading of the barcode was performed a hundred times, and the barcode could be successfully read 68 times. In Comparative Example 6, reading of the barcode was performed a hundred times, and the barcode could not be read even once.

TABLE 5

Comprehensive grade and readability ratio of barcode
(The width W of thin bars was 0.375 mm, and bars were drawn in parallel with the conveying direction.)

| | Max. amplitude value (mm) | Comprehensive grade | Readability ratio |
|---|---|---|---|
| Example 14 | 0.383 | 2.0 | 100/100 |
| Example 15 | 0.526 | 1.7 | 93/100 |
| Example 16 | 1.128 | 1.0 | 70/100 |
| Comparative Example 7 | 1.615 | 0.0 | 0/100 |

As seen from Table 5, in Examples 14 to 16, the barcode was recorded while the amplitude was equal to or smaller than the reference value (1.3×W+0.88) mm, whereas in Comparative Example 7, the barcode was recorded while the amplitude was larger than the reference value (1.3×W+0.88) mm.

Further, as seen from Table 5, in Examples 14 and 15, the barcode was recorded while the amplitude was equal to or smaller than the reference value (2.7×W−0.18) mm.

As a result, in Example 14, reading (scanning) of the barcode was performed a hundred times, and the barcode could be successfully read a hundred times. In Example 15, reading of the barcode was performed a hundred times, and the barcode could be successfully read 93 times. In Example 16, reading of the barcode was performed a hundred times, and the barcode could be successfully read 70 times. In Comparative Example 7, reading of the barcode was performed a hundred times, and the barcode could not be read even once.

TABLE 6

Comprehensive grade and readability ratio of barcode
(The width W of thin bars was 0.5 mm, and bars were drawn in parallel with the conveying direction.)

| | Max. amplitude value (mm) | Comprehensive grade | Readability ratio |
|---|---|---|---|
| Example 17 | 0.383 | 2.0 | 100/100 |
| Example 18 | 0.526 | 1.7 | 89/100 |
| Example 19 | 1.128 | 1.0 | 81/100 |
| Comparative Example 8 | 1.615 | 0.0 | 0/100 |

As seen from Table 6, in Examples 17 to 19, the barcode was recorded while the amplitude was equal to or smaller than the reference value (1.3×W+0.88) mm, whereas in Comparative Example 8, the barcode was recorded while the amplitude was larger than the reference value (1.3×W+0.88) mm.

Further, as seen from Table 6, in Examples 17 to 19, the barcode was recorded while the amplitude was equal to or smaller than the reference value (2.7×W−0.18) mm.

As a result, in Example 17, reading (scanning) of the barcode was performed a hundred times, and the barcode could be successfully read a hundred times. In Example 18, reading of the barcode was performed a hundred times, and the barcode could be successfully read 89 times. In Example 19, reading of the barcode was performed a hundred times, and the barcode could be successfully read 81 times. In Comparative Example 8, reading of the barcode was performed a hundred times, and the barcode could not be read even once.

When drawing bars of a barcode perpendicularly to the conveying direction and the thickness of the thin bars is 0.25 mm, it is desirable to draw the barcode while the maximum value of the amplitude of the vibration of the container is 0.30 mm or smaller, preferably 0.15 mm or smaller. When drawing bars of a barcode perpendicularly to the conveying direction and the thickness of the thin bars is 0.375 mm, it is desirable to draw the barcode while the maximum value of the amplitude of the vibration of the container is 0.58 mm or smaller, preferably 0.30 mm or smaller. When drawing bars of a barcode perpendicularly to the conveying direction and the thickness of the thin bars is 0.5 mm, it is desirable to draw the barcode while the maximum value of the amplitude of the vibration of the container is 0.85 mm or smaller, preferably 0.45 mm or smaller. When drawing bars of a barcode in parallel with the conveying direction and the thickness of the thin bars is 0.25 mm, it is desirable to draw the barcode while the maximum value of the amplitude of the vibration of the container is 1.21 mm or smaller, preferably 0.50 mm or smaller. When drawing bars of a barcode in parallel with the drawing direction and the thickness of the thin bars is 0.375 mm, it is desirable to draw the barcode while the maximum value of the amplitude of the vibration of the container is 1.37 mm or smaller, preferably 0.83 mm or smaller. When drawing bars of a barcode in parallel with the drawing direction and the thickness of the thin bars is 0.5 mm, it is desirable to draw the barcode while the maximum value of the amplitude of the vibration of the container is 1.53 mm or smaller, preferably 1.17 mm or smaller.

TABLE 7

Comprehensive grade of QR code (line width W = 0.375 mm)

| | Max. amplitude value (mm) | Comprehensive grade | Readability |
|---|---|---|---|
| Example 20 | 0.087 | 2.0 | Readable |
| Example 21 | 0.185 | 0.0 | Readable |
| Comparative Example 9 | 0.383 | 0.0 | Unreadable |
| Comparative Example 10 | 0.526 | 0.0 | Unreadable |

As seen from Table 7, in Examples 20 and 21, the QR code was recorded while the amplitude was equal to or smaller than a reference value (1.6×W−0.30) mm. In Comparative Examples 9 and 10, the QR code was recorded while the amplitude was larger than the reference value (1.6×W−0.30) mm. The reference value (1.6×W−0.30) mm is a linear function of the line width W of the QR code that is indicated by a solid line in FIG. 16.

Further, as seen from Table 7, in Example 20, the QR code was recorded while the amplitude was equal to or smaller than a reference value (0.64×W−0.14) mm. The reference value (0.64×W−0.14) mm is a linear function of the line width W of the QR code that is indicated by a broken line in FIG. 16.

As a result, in Examples 20 and 21, reading (scanning) of the QR code resulted in that the QR code could be successfully read. In Comparative Examples 9 and 10, reading of the QR code resulted in that the QR code could not be read.

TABLE 8

Comprehensive grade of QR code (line width W = 0.5 mm)

| | Max. amplitude value (mm) | Comprehensive grade | Readability |
|---|---|---|---|
| Example 22 | 0.087 | 2.0 | Readable |
| Example 23 | 0.185 | 0.0 | Readable |
| Example 24 | 0.383 | 0.0 | Readable |
| Comparative Example 11 | 0.526 | 0.0 | Unreadable |

As seen from Table 8, in Examples 22 to 24, the QR code was recorded while the amplitude was equal to or less than the reference value (1.6×W−0.30) mm. In Comparative Example 11, the QR code was recorded while the amplitude was larger than the reference value (1.6×W−0.30) mm.

Further, as seen from Table 8, in Example 22, the QR code was recorded while the amplitude was equal to or smaller than the reference value (0.64×W−0.14) mm or smaller.

As a result, in Examples 22 to 24, reading (scanning) of the QR code resulted in that the QR code could be successfully read. In Comparative Example 11, reading of the QR code resulted in that the QR code could not be read.

When the line width of the QR code is 0.375 mm, it is desirable to draw the QR code while the maximum value of the amplitude of the vibration of the container is 0.3 mm or smaller, preferably 0.1 mm or smaller. When the line width of the QR code is 0.5 mm, it is desirable to draw the QR code while the maximum value of the amplitude of the vibration of the container is 0.5 mm or smaller, preferably 0.18 mm or smaller.

By employing a plurality of methods described below in the conveyor device 10, it is possible to reduce the amplitude of the vibration and improve the readability of a scan image. Such methods include a method of providing a cushioning member on a surface of the stopper that is to contact the container to thereby relieve the vibration immediately after the container collides on the stopper, a method of providing a guide member for regulating the posture of the container at a position above the BCU along the container conveying direction to thereby prevent the container from being detached from the belt or a roller to thereby reduce vibration thereof, a method of setting the BCU on which the stopper is provided on the floor separately from adjacent BCUs to thereby prevent transmission of vibration from the adjacent BCUs. By employing at least one of these methods, it is possible to record a scan image, which would be recorded with an image quality lower than a level readable by a reading device if these methods were not employed, with an image quality equal to or higher than the readable level. Or, it is possible to record a scan image, which would be recorded with a predetermined comprehensive grade (e.g., grade D), with a grade higher than the predetermined grade (e.g., grade C).

In the embodiment and modified example described above, a barcode or a two-dimensional code is recorded on a RL while the amplitude of the vibration of the container C is equal to or smaller than the reference value. Instead of this, a barcode or a two-dimensional code may be recorded on a RL within a latter half of an image recording time, as will be explained in the following examples.

In the following examples and comparative examples, an image shown in FIG. 17 was recorded on a RL by using a laser marker rewritable laser marker LDM200-110 manufactured by Ricoh Company Ltd., which was adjusted to a laser power of 75% and a scanning speed of 3,000 mm/s, and conveying a container C (ORICON 32B manufactured by Sanko Co., Ltd.) with the conveyor device 10. The readability of a barcode of the image was verified with a barcode scanner BL-1301HA manufactured by Keyence Corporation, whereas the readability of a two-dimensional code was verified with a two-dimensional code scanner SR-610 manufactured by Keyence Corporation.

Example 25

Figure 17:
FIG. 17 is a diagram showing an example image recorded on a RL.
Figure 19:
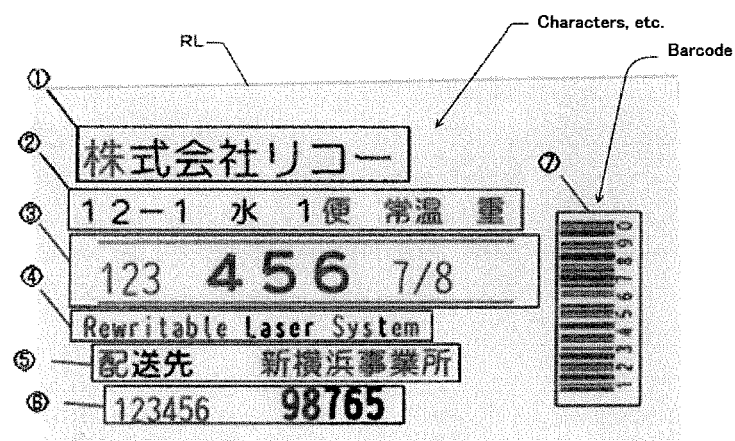
FIG. 19 is a diagram showing an image recording order of Example 25.

In Example 25, an image shown in FIG. 17 including a barcode was recorded in the writing order indicated by (1) to (7) in FIG. 19, so that the barcode may be recorded within the latter half (e.g., from 0.62 s to 0.83 s) of the recording time (with a length of 0.83 s) of the image. Reading (scanning) of the recorded barcode was performed a hundred times with the barcode scanner mentioned above, which resulted in 97 times of successful reading. The time slot in which to record the barcode is not limited to the time slot mentioned above, but may be an arbitrary time slot within the latter half of from 0.415 s to 0.83 s of the recording time (with a length of 0.83 s).

Example 26

Figure 20:
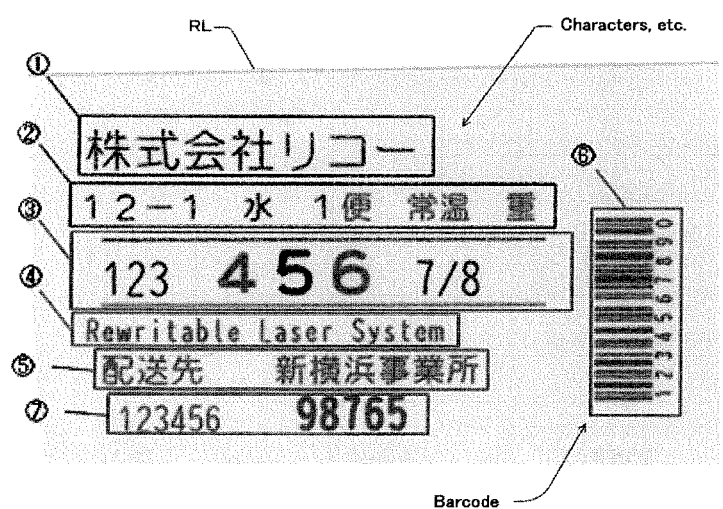
FIG. 20 is a diagram showing an image recording order of Example 26.

In Example 26, the image shown in FIG. 17 including a barcode was recorded on a RL in the writing order indicated by (1) to (7) in FIG. 20, so that the barcode may be recorded within the latter half (e.g., from 0.53 s to 0.74 s) of the recording time (with a length of 0.83 s) of the image. Reading (scanning) of the recorded barcode was performed a hundred times with the barcode scanner mentioned above, which resulted in 98 times of successful reading. The time slot in which to record the barcode is not limited to the time slot mentioned above, but may be an arbitrary time slot within the later half of from 0.415 s to 0.83 s) of the recording time (with a length of 0.83 s).

Example 27

Figure 18:
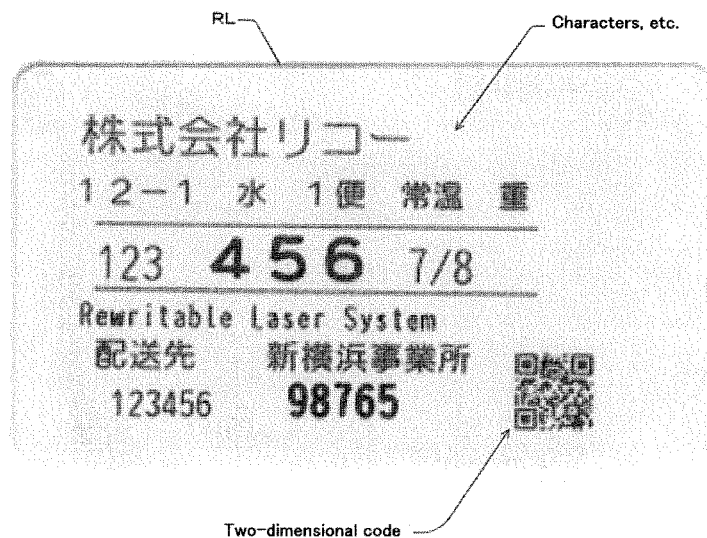
FIG. 18 is a diagram showing another example image recorded on a RL.
Figure 21:
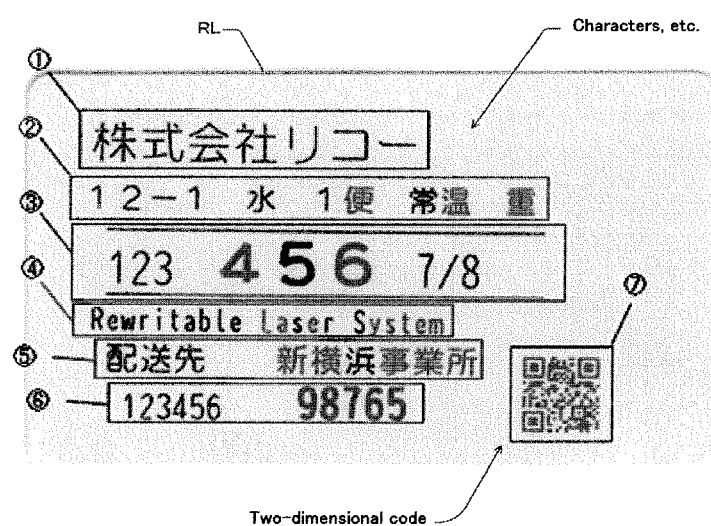
FIG. 21 is a diagram showing an image recording order of Example 27.

In Example 27, an image shown in FIG. 18 including a two-dimensional code was recorded on a RL in the writing order indicated by (1) to (7) in FIG. 21, so that the two-dimensional code may be recorded within the latter half (e.g., from 0.63 s to 1.14 s) of the recording time (with a length of 1.14 s) of the image. Reading (scanning) of the recorded two-dimensional code was performed with the two-dimensional code scanner mentioned above, which resulted in successful reading. The time slot in which to record the two-dimensional code is not limited to the time slot mentioned above, but may be an arbitrary time slot within the latter half of from 0.57 s to 1.14 s of the recording time (with a length of 1.14 s).

Comparative Example 12

Figure 22:
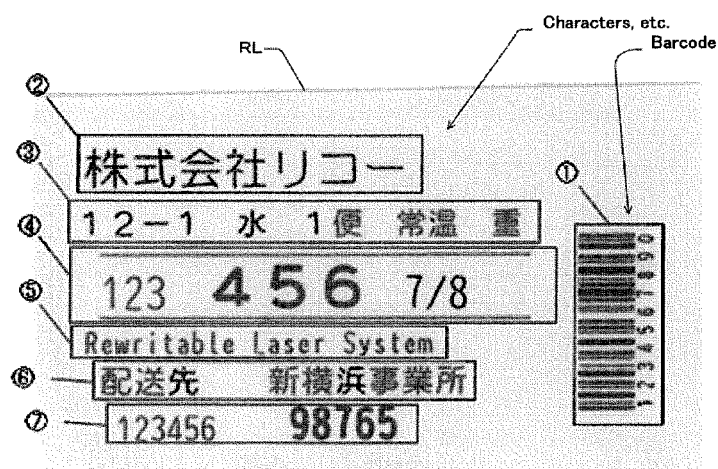
FIG. 22 is a diagram showing an image recording order of Comparative Example 12.

In Comparative Example 12, the image shown in FIG. 17 including a barcode was recorded on a RL in the writing order indicated by (1) to (7) in FIG. 22, so that the barcode may be recorded within the former half (e.g., from 0.00 s to 0.21 s) of the recording time (with a length of 0.83 s) of the image. Reading of the recorded barcode was performed a hundred times with the barcode scanner mentioned above, which resulted in not even once of successful reading.

Comparative Example 13

Figure 23:
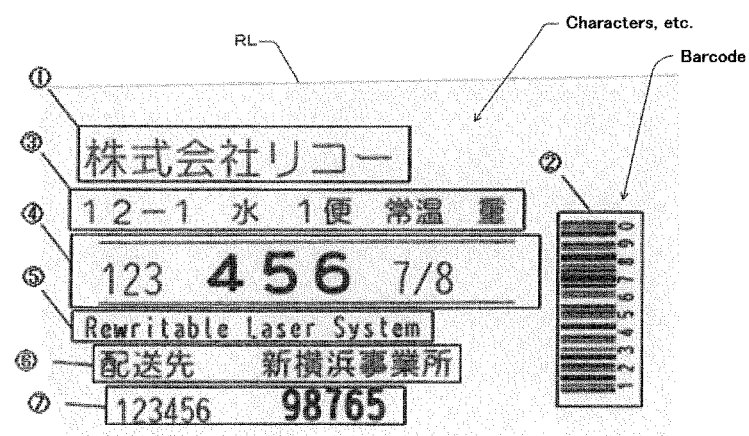
FIG. 23 is a diagram showing an image recording order of Comparative Example 13.

In Comparative Example 13, the image shown in FIG. 17 including a barcode was recorded on a RL in the writing order indicated by (1) to (7) in FIG. 23, so that the barcode may be recorded within the former half (e.g., from 0.07 s to 0.28 s) of the recording time (with a length of 0.83 s) of the image. Reading of the recorded barcode was performed a hundred times with the barcode scanner mentioned above, which resulted in not even once of successful reading.

Comparative Example 14

Figure 24:
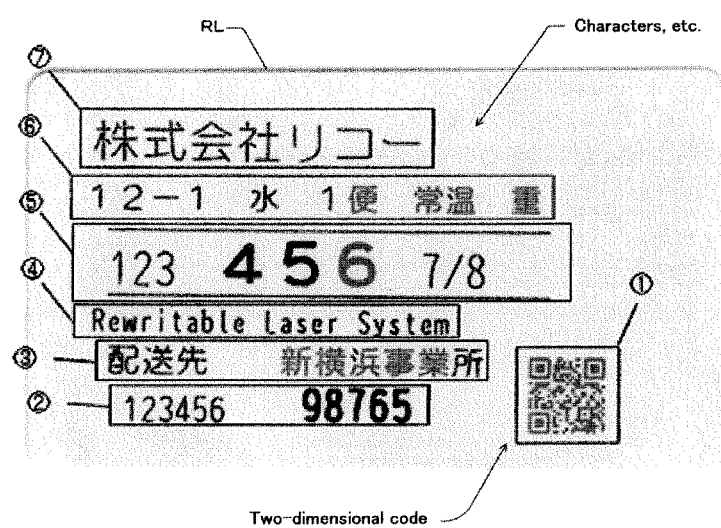
FIG. 24 is a diagram showing an image recording order of Comparative Example 14.

In Comparative Example 14, the image shown in FIG. 18 including a two-dimensional code was recorded on a RL in the writing order indicated by (1) to (7) in FIG. 24, so that the two-dimensional code may be recorded in the former half (e.g., from 0.00 s to 0.51 s) of the recording time (with a length of 1.14 s) of the image. Reading of the recorded two-dimensional code was performed with the two-dimensional code scanner mentioned above, which resulted in unsuccessful reading.

Aspects of the present invention are as follows, for example.

<1> An image recording system for recording an image on a recording medium attached to a conveyed article, including:
  a conveyor device configured to convey a conveyed article in a predetermined conveying direction; and
  a recording device provided on at least one side of the conveyor device in a direction perpendicular to the conveying direction and capable of contactlessly recording an image on a recording medium being located at a position facing the recording device,
  wherein the image includes a scan image to be read by a reading device,
  wherein the conveyor device decelerates the conveyed article by observing the position at which the recording medium will face the recording device as a target stop position, and
  wherein the recording device records the scan image on the recording medium after the conveyed article reaches the target stop position and while the amplitude of vibration of the conveyed article is equal to or smaller than a reference value.
<2> The image recording system according to <1>,
  wherein the scan image is a barcode including bars, of which longer direction is perpendicular to the conveying direction, and
  wherein the reference value is 2.2×W−0.25 (mm), where W is the width of the bars.
<3> The image recording system according to <1>,
  wherein the scan image is a barcode including bars, of which longer direction is parallel with the conveying direction, and
  wherein the reference value is 1.3×W+0.88 (mm), where W is the width of the bars.
<4> The image recording system according to <1>,
  wherein the scan image is a two-dimensional code, and
  wherein the reference value is 1.6×W−0.3 (mm).
<5> The image recording system according to any one of <1> to <4>,
  wherein the image includes an image other than the scan image, and
  wherein the recording device records the image other than the scan image while the amplitude is equal to or smaller than another reference value that is larger than the reference value.
<6> An image recording system for recording an image on a recording medium attached to a conveyed article, including:
  a conveyor device configured to convey a conveyed article in a predetermined conveying direction; and
  a recording device provided on at least one side of the conveyor device in a direction perpendicular to the conveying direction and capable of contactlessly recording an image on a recording medium being located at a position facing the recording device,
  wherein the image includes a scan image to be read by a reading device,
  wherein the conveyor device decelerates the conveyed article by observing a position at which the recording medium will face the recording device as a target stop position, and
  wherein the recording device records the scan image on the recording medium within a latter half of a recording time of the image.
<7> The image recording system according to any one of <1> to <6>,
  wherein the recording medium is a thermally reversible recording medium.
<8> The image recording system according to <7>,
  wherein the recording device records the image by irradiating the thermally reversible recording medium with laser light.
<9> The image recording system according to any one of <1> to <8>,
  wherein the scan image includes a barcode.
<10> The image recording system according to any one of <1> to <9>,
  wherein the scan image includes a two-dimensional code.
<11> The image recording system according to any one of <1> to <10>,
  wherein the scan image includes a character recognizable by the reading device.
<12> An image rewriting system for rewriting an image on a recording medium, including:
  the image recording system according to any one of <1> to <11> in which the image has been recorded on the recording medium in advance: and
  an erasing device provided on an upstream side of the recording device in the conveying direction and capable of erasing the image recorded on the recording medium being located at a position facing the erasing device,
  wherein the conveyor device decelerates the conveyed article by observing a position at which the recording medium will face the erasing device as another target stop position, and
  wherein the erasing device erases the image recorded on the recording medium after the conveyed article reaches the another target stop position.
<13> The image rewriting system according to <12>,
  wherein a plurality of conveyed articles are conveyed by turns by the conveyor device in the conveying direction,
  wherein the image rewriting system further includes:
  a first stopper movable between a first stopping position for stopping one conveyed article of the plurality of conveyed articles at the target stop position and a first retracted position that is retracted from the first stopping position; and
  a second stopper movable between a second stopping position for stopping another conveyed article subsequent to the one conveyed article of the plurality of conveyed article at the another target stop position and a second retracted position that is retracted from the second stopping position,
  wherein the first stopper comes to the first stopping position before the one conveyed article reaches the target stop position, and the second stopper comes to the second stopping position before the another conveyed article reaches the another target stop position, and
  wherein vibration of the one conveyed article includes vibration of the one conveyed article that is caused when the one conveyed article is stopped by the first stopper at the target stop position and vibration of the another conveyed article that is caused when the another conveyed article is stopped by the second stopper at the another target stop position and that is transmitted to the one conveyed article via the conveyor to device.

<14> The image rewriting system according to <13>, wherein the recording device completes recording of the scan image before the another conveyed article is stopped by the second stopper.

<15> An image recording method for recording an image on a recording medium attached to a conveyed article,
the image including a scan image to be read by a reading device,
the method including:
conveying the conveyed article along a predetermined conveying path;
decelerating the conveyed article by observing a predetermined position on the conveying path as a target stop position; and
recording an image on the recording medium after the conveyed article reaches the target stop position,
wherein in the recording, the scan image is recorded on the recording medium while the amplitude of vibration of the conveyed article is equal to or smaller than a reference value.

<16> The image recording method according to <15>,
wherein the image includes an image other than the scan image, and
wherein in the recording, the image other than the scan image is recorded on the recording medium while the amplitude is equal to or smaller than another reference value that is larger than the reference value.

<17> An image recording method for recording an image on a recording medium attached to a conveyed article,
the image including a scan image to be read by a reading device,
the method including:
conveying the conveyed article along a predetermined conveying path;
decelerating the conveyed article by observing a predetermined position on the conveying path as a target stop position; and
recording the image on the recording medium after the conveyed article reaches the predetermined position,
wherein in the recording, the scan image is recorded within a latter half of a recording time of the image.

This application claims priority to Japanese application No. 2013-215911, filed on Oct. 17, 2013 and incorporated herein by reference.

What is claimed is:

1. An image recording system for recording an image on a recording medium attached to a conveyed article, comprising:
a conveyor device configured to convey a conveyed article in a predetermined conveying direction; and
a recording device provided on at least one side of the conveyor device in a direction perpendicular to the conveying direction and configured to contactlessly record an image on a recording medium being located at a position facing the recording device,
wherein the image includes a scan image to be read by a reading device,
wherein the conveyor device decelerates the conveyed article by observing a position at which the recording medium will face the recording device as a target stop position, and
wherein after the conveyed article has decelerated and reached the target stop position, the recording device records the scan image on the recording medium while an amplitude of vibration of the conveyed article is equal to or smaller than a reference value, or the recording device records the scan image on the recording medium within a latter half of a recording time of the image.

2. The image recording system according to claim 1, wherein the scan image is a barcode including a plurality of bars, of which longer direction is perpendicular to the conveying direction, and
wherein the reference value is 2.2×W−0.25 (mm), where W is width of thin bars among the plurality of bars.

3. The image recording system according to claim 1, wherein the scan image is a barcode including a plurality of bars, of which longer direction is parallel with the conveying direction, and
wherein the reference value is 1.3×W+0.88 (mm), where W is width of thin bars among the plurality of bars.

4. The image recording system according to claim 1, wherein the scan image is a two-dimensional code including a plurality of bars, and
wherein the reference value is 1.6×W−0.3 (mm), where W is line width of thin bars among the plurality of bars in the two-dimensional code.

5. The image recording system according to claim 1, wherein the recording medium is a thermally reversible recording medium.

6. The image recording system according to claim 5, wherein the recording device records the image by irradiating the thermally reversible recording medium with laser light.

7. The image recording system according to claim 1, wherein the scan image includes a barcode.

8. The image recording system according to claim 1, wherein the scan image includes a two-dimensional code.

9. The image recording system according to claim 1, wherein the scan image includes a character recognizable by the reading device.

10. An image rewriting system for rewriting an image on a recording medium, comprising:
the image recording system according to claim 1 in which the image has been recorded on the recording medium in advance: and
an erasing device provided at an upstream side of the recording device in the conveying direction and configured to erase the image recorded on the recording medium being located on a position facing the erasing device,
wherein the conveyor device decelerates the conveyed article by observing a position at which the recording medium will face the erasing device as another target stop position, and
wherein the erasing device erases the image recorded on the recording medium after the conveyed article reaches the another target stop position.

11. The image rewriting system according to claim 10, wherein a plurality of conveyed articles are conveyed by turns by the conveyor device in the conveying direction, wherein the image rewriting system further comprises:
a first stopper movable between a first stopping position for stopping one conveyed article of the plurality of conveyed articles at the target stop position and a first retracted position that is retracted from the first stopping position: and
a second stopper movable between a second stopping position for stopping another conveyed article subsequent to the one conveyed article of the plurality of conveyed articles at the another target stop position and a second retracted position that is retracted from the second stopping position, wherein the first stopper comes to the first stopping position before the one conveyed article reaches the target stop position, and the second stopper comes to the second stopping position before the another conveyed article reaches the another target stop position, and wherein vibration of the one conveyed article includes vibration of the one conveyed article that is caused when the one conveyed article is stopped by the first stopper at the target stop position and vibration of the another conveyed article that is caused when the another conveyed article is stopped by the second stopper at the another target stop position and that is transmitted to the one conveyed article via the conveyor device.

12. The image rewriting system according to claim 11, wherein the recording device completes recording of the scan image before the another conveyed article is stopped by the second stopper.

13. An image recording system for recording an image on a recording medium attached to a conveyed article, comprising:
- a conveyor device configured to convey a conveyed article in a predetermined conveying direction; and
- a recording device provided on at least one side of the conveyor device in a direction perpendicular to the conveying direction and configured to contactlessly record an image on a recording medium being located at a position facing the recording device,
- wherein the image includes a scan image to be read by a reading device,
- wherein the conveyor device decelerates the conveyed article by observing a position at which the recording medium will face the recording device as a target stop position,
- wherein after the conveyed article has decelerated and reached the target stop position, the recording device records the scan image on the recording medium while an amplitude of vibration of the conveyed article is equal to or smaller than a reference value, or the recording device records the scan image on the recording medium within a latter half of a recording time of the image,
- wherein the image includes an image other than the scan image, and
- wherein the recording device records the image other than the scan image while the amplitude of vibration is equal to or smaller than another reference value that is larger than the reference value.

14. An image recording method for recording an image on a recording medium attached to a conveyed article, comprising:
- (a) conveying a conveyed article along a predetermined conveying path;
- (b) decelerating the conveyed article by observing a predetermined position on the conveying path as a target stop position; and
- (c) recording an image on a recording medium after the conveyed article reaches the target stop position,
- wherein the image includes a scan image to be read by a reading device, and
- wherein after the conveyed article has decelerated in (b) and reached the target stop position, the scan image is recorded in (c) on the recording medium while an amplitude of vibration of the conveyed article is equal to or smaller than a reference value, or the scan image is recorded in (c) on the recording medium within a latter half of a recording time of the image.

15. The image recording method according to claim 14, wherein the image includes an image other than the scan image, and
wherein in the recording, the image other than the scan image is recorded on the recording medium while the amplitude of vibration is equal to or smaller than another reference value that is larger than the reference value.

* * * * *